United States Patent [19]
Nolan et al.

[11] Patent Number: 5,105,196
[45] Date of Patent: Apr. 14, 1992

[54] LORAN-C ALIGNMENT METHOD

[76] Inventors: Thomas Patrick Nolan, 422 Obrecht Rd., Millersville, Md. 21108; Charles B. Branch, 2021 Fairfield Ct., North, League City, Tex. 77573

[21] Appl. No.: 659,226

[22] Filed: Feb. 22, 1991

[51] Int. Cl.$^5$ ............................................. G01S 1/24
[52] U.S. Cl. .................................................... 342/389
[58] Field of Search .................................... 342/389, 390

[56] References Cited

U.S. PATENT DOCUMENTS

| | | | |
|---|---|---|---|
| 4,001,598 | 1/1977 | Johannessen | 342/388 |
| 4,482,896 | 11/1984 | Menick | 342/390 |

Primary Examiner—Gregory C. Issing
Attorney, Agent, or Firm—Foley & Lardner

[57] ABSTRACT

An alignment procedure to insure the proper and faithful reproduction of the automatic control loop SERial DAta (SERDA) instructions issued by the Pulse Amplitude and Timing COntrol Unit (PATCO). This reproduction takes place during high level, multipulsed, radio frequency energy transfer to the antenna system. The precise reproduction of the low level digital pulse shape and timing instructions will insure that the transmitter set is operating within the constraints of the International Telecommunications Union for radio transmissions and the specifications which govern the original design during "automatic operation" at a specified Envelope to Cycle Difference (ECD). The alignment procedure once accomplished allows for a simplified monitoring technique, to insure continued proper operation. This monitoring and correction routine can be accomplished using personnel of less technical expertise and test equipments of less complexity and cost.

10 Claims, 22 Drawing Sheets

LORAN-C ALIGNMENT METHOD

BACKGROUND OF THE INVENTION

1. Field of the Invention

The invention relates to alignment of Loran-C navigational systems. Specifically, the method of the invention insures the faithful reproduction of low level digital pulse shape and timing instructions issued by automatic, microprocessor controlled, closed loops when converted to high level radio frequency multipulsed Loran-C navigational signal transmissions.

2. Related Art

The 1947 International Telecommunications Union (ITU) conference at Atlantic City, N.J. set the frequency bandwidth for Loran-C Radio Navigation signals to a 20 kilohertz band, centered about 100 kilohertz. The 1959 Geneva Radio Conference further refined this bandwidth definition for Loran-C radio navigation signals.

The accepted interpretation for all aspects of the Loran-C radio navigation bandwidth allocation is that 99% of the total energy radiated must be within the band of frequencies between 90 kilohertz to 110 kilohertz with no more than ½ of one percent above or below the allocated band. This international commitment constrains both the carrier frequency and the pulse shape of all Loran-C radio navigation transmissions throughout the world.

The rise time of a Loran-C pulse should be as fast as possible, within bandwidth constraints, to present the maximum pulse amplitude to a user's receiver prior to arrival of early skywave, which are transmitted signals reflected from the ionosphere. Because skywaves travel further from the transmitter to the receiver than groundwaves, skywaves arrive at the receiver later. The fast rise time minimizes pulse leading edge skywave contamination of the groundwaves used for pulse tracking. Loran-C radio navigation systems are also "multipulsed," radiating more than one pulse per Loran Transmission Interval. Thus, the tail or trailing edge of each radiated pulse must be sufficiently attenuated before beginning the subsequent pulse. Precise control of the radiated pulses' leading edges and controlled attenuation of the pulses' trailing edges are required for a user to unambiguously extract accurate navigational information.

In currently operating Megapulse, Inc. Loran-C equipments, precisely controlled current pulses, which drive a filter-antenna system, resulting in Loran-C pulses which peak about 65 microseconds after time=0. At this point in time a variable damping impedance is switched into the filter to accomplish required trailing edge attenuation. For example, the present generation of Loran-C transmitting equipment, such as that manufactured by Megapulse, Inc., 8 Preston Court, Bedford, Mass. 01730, constructs or synthesizes the Loran-C pulses by supplying drive to only the first four (two positive and two negative) half-cycles of the carrier for each Loran-C pulse. This is accomplished using Drive Half Cycle (DHC) signals. To construct such signals, a plurality of Half Cycle Generator (HCG) units within the Loran-C transmitter each generate a 5 microsecond half cycle current pulse for each Loran-C pulse. A Pulse Amplitude and Timing Control (PATCO) unit defines parallel combinations of Half Cycle Generator (HCG) units, and sets the firing time and amplitude of the individual HCG outputs in response to on-line sampling of a combined HCG output and the Loran-C pulse. Since this closed loop operation requires compliance with desired pulse parameters, alignment of the Loran-C transmitter is critical.

In order for a transmitter set to achieve the required precise leading edge control, manufacturers assume that the transmitter and its associated control circuitry function within design limitations regardless of the number of repairs and associated parts replacements, as long as the repairs are made using parts pretested to the manufacturers' specifications and the repairs are made by qualified personnel. Historically, this has not been the case. It has also been found that under actual operating conditions portions of the low level logic control located in the HCG, are effected by changing the numbers of HCGs being operated in parallel. For example, if the low level logic circuits function properly with 8 HCGs operating on a particular half cycle, the circuitry will not necessarily operate to produce the proper level, when, for example, 24 Half Cycle Generators are operated in parallel. Because much field repair is accomplished by exchanging modules between a suspect HGC and an assumed trouble free unit, this anomaly leads to many false conclusions.

Currently, adjustment of the low level logic circuits within each HCG is normally performed external to the transmitter while a Half Cycle Generator is at a Module Repair Facility. Since each Loran-C transmitter is basically a "one-of-a-kind" custom built unit, there are subtle differences in component tolerances. To insure that precise pulse shape and frequency bandwidth constraints are met, it would be optimum to "customize" the adjustment of the HCG low level logic circuitry by accomplishing the appropriate adjustments with the Half Cycle Generator installed and operating in each individual transmitter set.

To date, no efficient technique has been developed to accomplish this. Manufacturers' alignment procedures require technicians to first determine a "known good circuit board", make closed loop adjustments effecting up to 25 individual HCGs and make comparisons at "standard conditions." Since each adjustment effects all components of a particular closed loop, the manufacturers' approach presents a very difficult set of conditions to meet. This is the area which this invention addresses.

SUMMARY OF THE INVENTION

In view of the above limitations of the related art it is an object of the invention to provide a method for aligning a Loran-C transmitter that does not require a "known good circuit board."

It is another object of the invention to provide an alignment method which permits field alignment of the pulse forming circuitry to standards as good as or better than if the entire transmitter were adjusted at the manufacturer's facility.

It is still another object of the invention to test and align Loran-C transmitters employing parameters encountered in closed loop conditions peculiar to that specific transmitter installation.

It is still another object of the invention to lock loop parameters at their normal operating values and compare specific voltages with Digital Amplitude Reference (DAR) words to verify correct performance of a system.

The above objects of the invention and others are accomplished by an alignment procedure in which a closed loop having a plurality of Half Cycle Generator (HCG) units operating with a Pulse Amplitude and Timing Controller (PATCO) unit is first reset to manufacturers default feedback loop values. The default feedback loop values are identical for all HCGs. These default values are retained by opening the feedback loop to prevent individual HCG level adjustments from affecting the plurality of HCGs for the particular Drive Half Cycle (DHC) under adjustment.

BRIEF DESCRIPTION OF THE DRAWINGS

The invention will be described with particular reference to the figures, in which:

FIG. 13 12 and FIG. 12a shows a distribution board chassis.

DETAILED DESCRIPTION OF THE PREFERRED EMBODIMENTS

Loran-C systems employ a carrier frequency of about 100 KHz. Bandwidth constraints, and requirements for large ground wave coverage areas (areas within which accurate navigation information is available) and transmitted pulse stability lead to a Standard Loran-C Pulse Envelope shape. The shape of the "Standard Loran-C Pulse Envelope" as a function of time is given by:

$$F(t) = t^2 e^{-2t/dtp}$$

Where:
dt$_p$ = The time to the peak of the pulse, which for the Standard Loran-C pulse is defined as 65 microseconds after the start of the pulse.

Therefore, the above formula becomes:

$$F(t) = t^2 e^{-2t/65}$$

Figure 1:
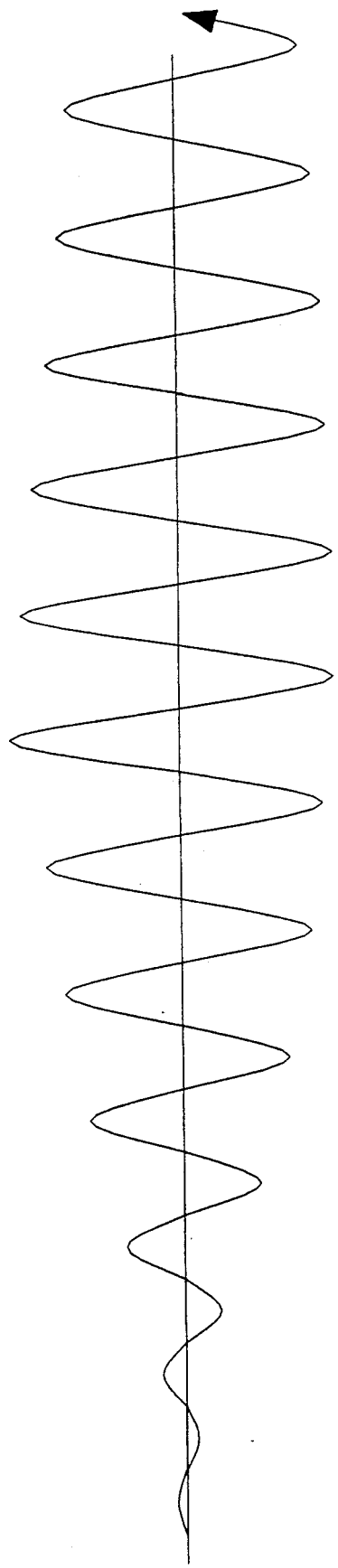
FIG. 1 shows an ideal Loran-C Pulse.

As shown in FIG. 1, this Standard Loran-C Pulse rises to approximately 50% of peak amplitude in about 25 microseconds.

The rise time of the Loran-C pulse should be as fast as possible, within bandwidth constraints, to present the maximum pulse amplitude to the user's receiver prior to the arrival of early skywave. This fast rise time minimizes pulse leading edge skywave contamination at the point where a receiver samples the pulse, called the navigation extraction point, and maximizes the ground wave energy available at the receiver without detrimental skywave contamination.

To attain this objective, a Loran-C transmitted pulse is defined in terms of the transmitting antenna base current. The transmitting antenna system base current, I(t), is defined as:

for $I(t) = 0, t < T$ $$I(t) = A(t - T/dtp)^2 \exp[-2(t-T)dtp]\sin(w_o t + i)$$

for $T < t < t_p$

Where:
A = A constant related to the peak current in amperes
t = Time in microseconds
T = Time origin for the envelope (also referred to as Envelope to Cycle Difference (ECD) in microseconds)
dt$_p$ = pulse envelope rise time (65 microseconds)
w$_o$ = angular carrier frequency (0.2 Pi radians/microsecond)
i = the pulse phase code (zero or Pi radians)

For any time (t) greater than t$_p$, I(t) is controlled to satisfy the radiated frequency spectrum requirements.

Figure 2:
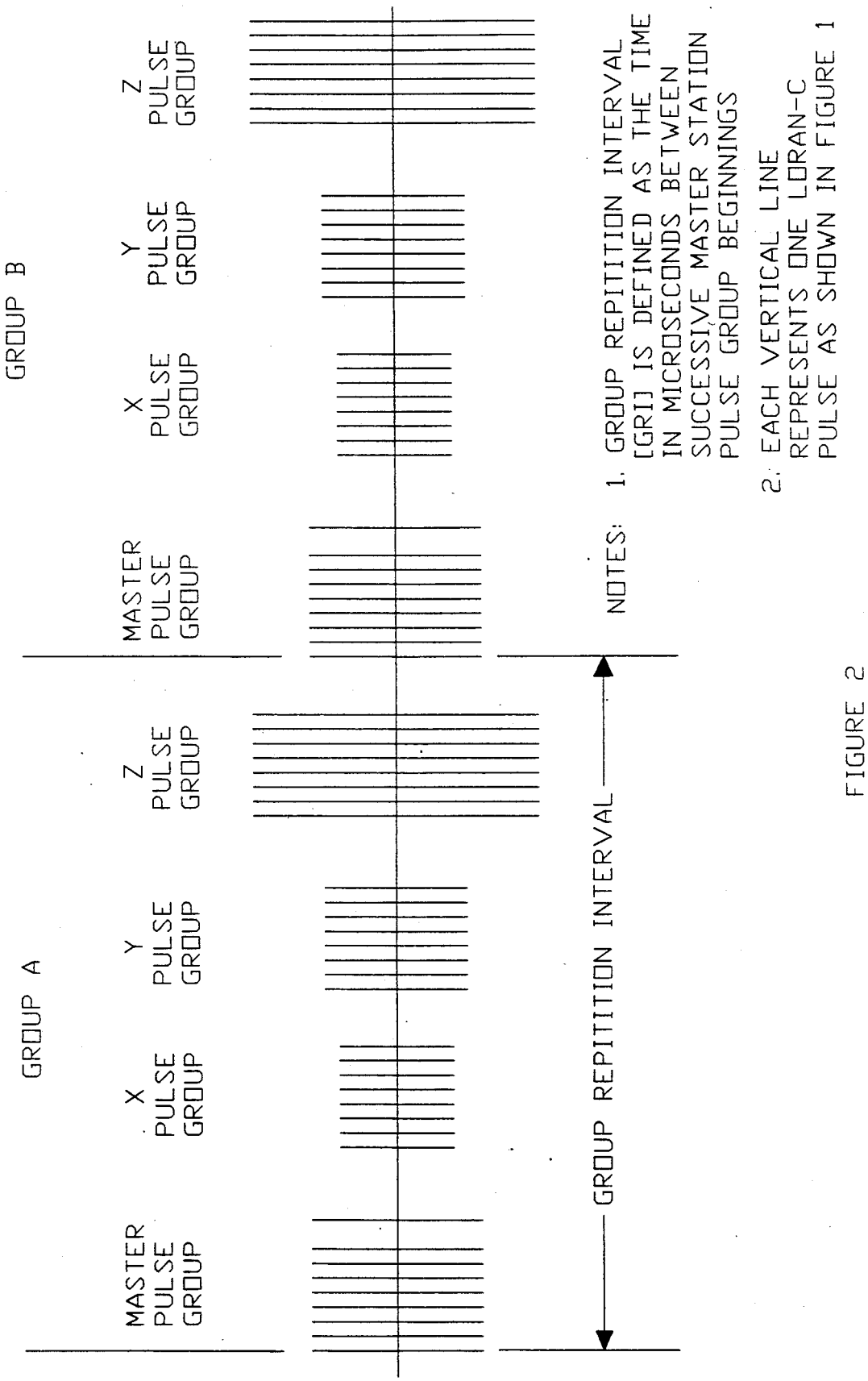
FIG. 2 further illustrates Loran-C Transmission Characteristics.
Figure 3:
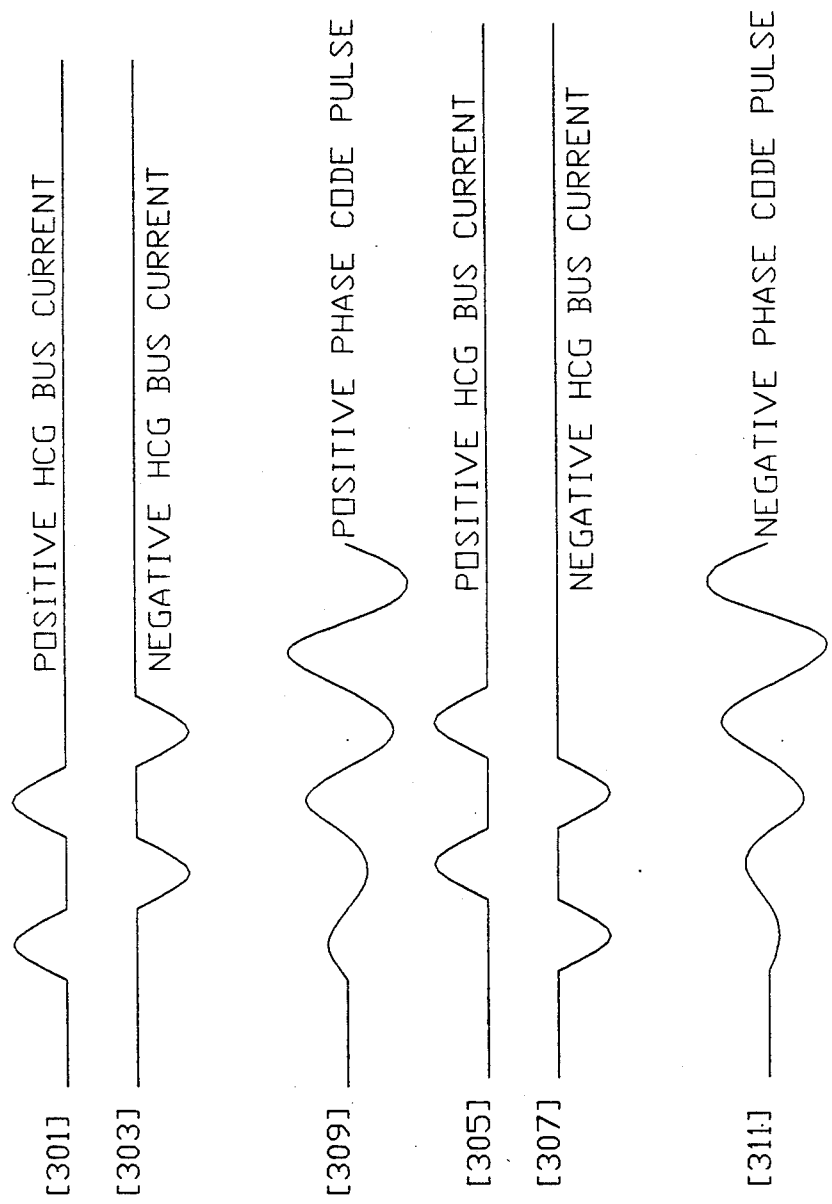
FIG. 3 shows current signals used in the formation of a Loran-C Pulse.

As the Loran-C transmission characteristics in FIG. 2 illustrate, Loran-C is a radio navigation system which radiates more than one pulse, e.g., X, Y, Z, per Loran Transmission Interval. In this "multipulsed system" containing the positioning information, a further pulse to pulse requirement exists. To prevent the leading edge of a Loran-C pulse from being contaminated by the trailing edge of the previous pulse, the tail of each radiated pulse within a pulse group, e.g., X, must be sufficiently attenuated before the beginning of the subsequent pulse, e.g., Y. Primarily as a result of skywave considerations, the tail of each pulse should be attenuated as quickly as possible after the leading edge attains peak pulse amplitude. However, bandwidth limitations add further constraints. The compromise between the bandwidth constraints and the pulse-to-pulse contamination presents conflicting pulse-to-pulse contamination and bandwidth limitations.

In one known system manufactured by Megapulse, Inc. of Bedford, Mass., four precisely controlled current pulses 301, 303, 305, 307 drive a filter/antenna system, in which the resulting Loran-C pulse peaks at 65 microseconds. Thus, a Loran-C pulse is constructed by driving two positive and two negative half cycles of the carrier in accordance with positive and negative phase codes, e.g., signals 309 and 311. A variable damping impedance, which attenuates the trailing edge, is then switched into the filter, as discussed below. The basic controllable building block for this type of "signal construction system" is the Half Cycle Generator (HCG) unit, shown in FIGS. 7 and 8. Each HCG produces a 5 microsecond half cycle current pulse for each Loran-C pulse. Each HCG current pulse is controlled both on an individual basis for internal time-of-firing, and by a microprocessor for pulse amplitude and time-of-firing group corrections.

Figure 4:
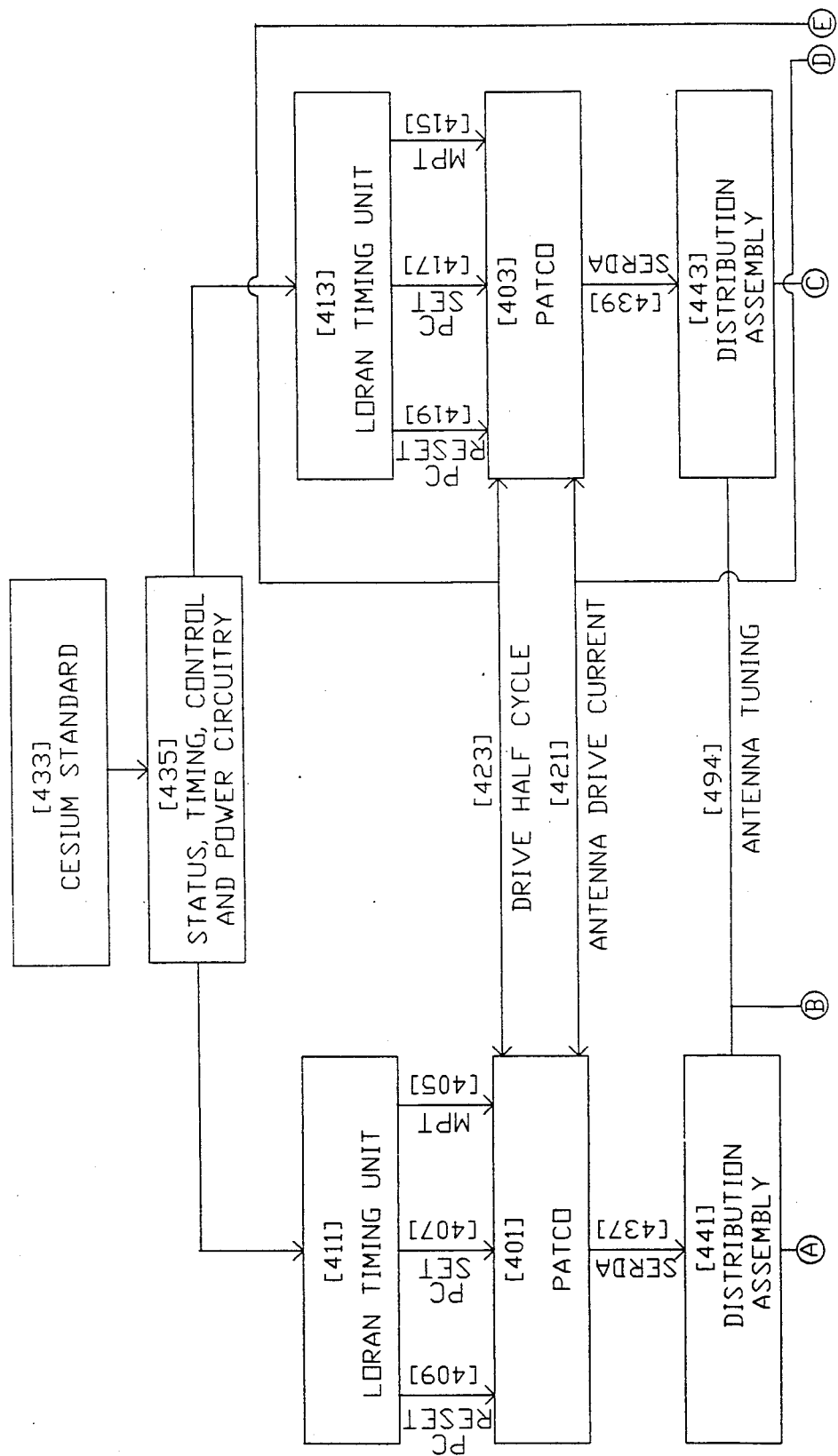
FIG. 4 and FIG. 4a is a block diagram of an AC-CUFIX 6500 transmitting station.
Figure 4A:
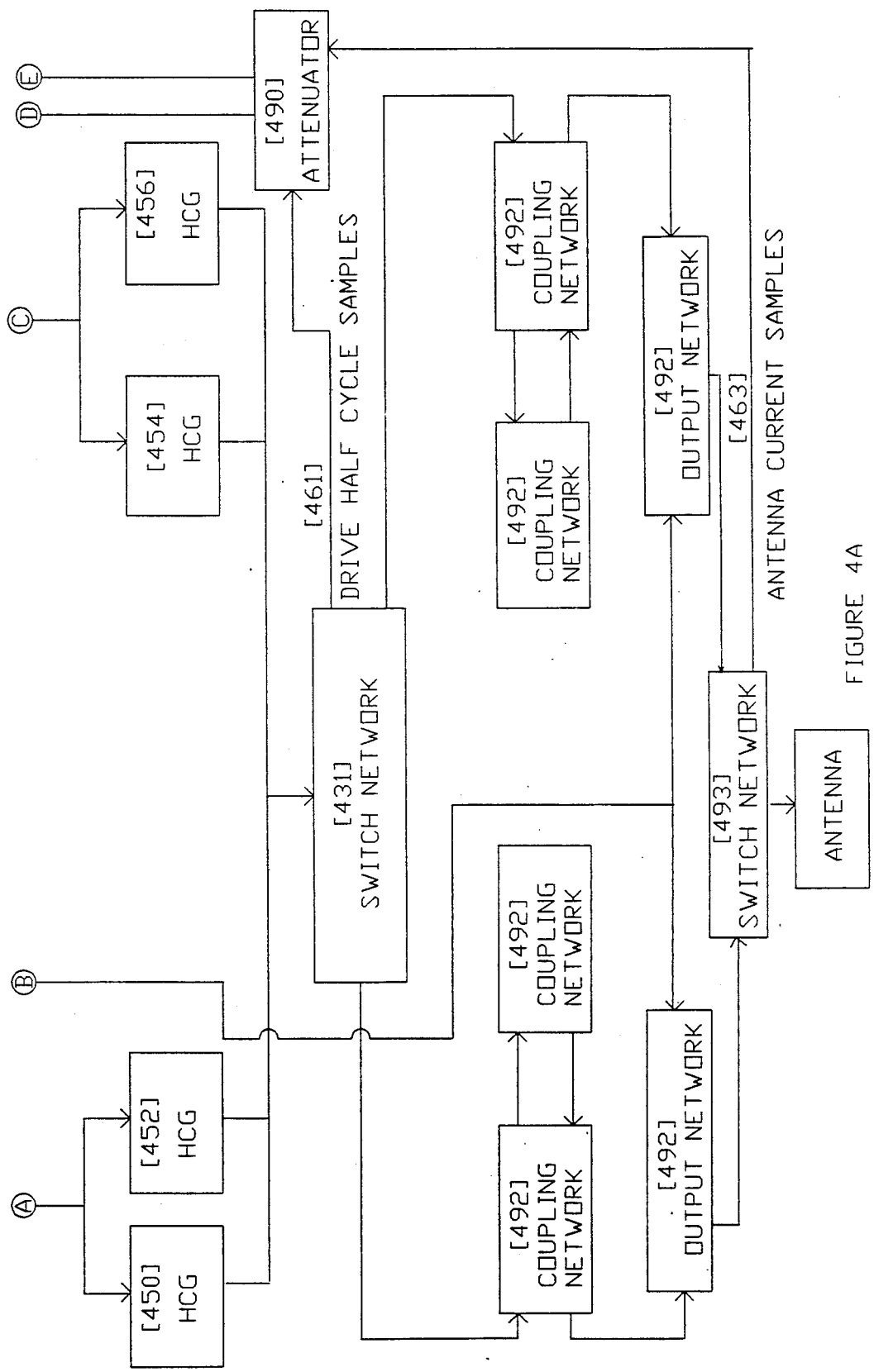

Depending on the power output requirements of an individual transmitting station, up to 64 Half Cycle Generators are typically incorporated within a single station transmitter set. As shown in FIG. 4 and FIG. 4a, Individual Half Cycle Generators are operated in parallel combinations during each half cycle. The primary control of the time origin of the envelopes, the Envelope to Cycle Difference (ECD), is accomplished by varying these parallel combinations. Further ECD control is obtained by individually controlling the time-of-firing of each Half Cycle Generator and the amplitude of each drive half cycle signal. Drive Half Cycle signals are sampled by a current transformer within a coupling network filter and are provided directly to a Pulse Amplitude and Timing Control (PATCO) unit.

Individual half cycle amplitude assignments and corrections, pulse group timing, as well as Half Cycle Generator parallel combination assignments are made by the Pulse Amplitude and Timing Control (PATCO) unit, e.g., 401, 403. The PATCO operates under microprocessor control, continuously updating HCG amplitude and timing in half cycle groups, based upon on-line sampling of the combined HCG output from switch network 431 and the transmitted Loran-C pulse via switch network 493. These outputs are routed on signal lines 461 and 463, respectively, to attenuator 490 and from there along signal lines 421 and 423 to the PATCO units 401, 403. It should be noted that coupling networks acting as filters and providing antenna tuning in response to signals on line 494 from signal distribution assemblies 441, 443 are located between switch networks 431 and 493. In this manner, the transmitter set continuously monitors and updates the quality of its transmissions to insure proper pulse leading edge characteristics for the user's receiver and insures compliance with authorized bandwidth constraints.

The Pulse Amplitude and Timing Controller (PATCO) unit control loop signals are derived from all required basic Loran-C signals, refined from a Cesium Beam Frequency Standard 433, which is the basis for all system timing plus on-line antenna and Drive Half Cycle (DHC) information. The ACCUFIX 6500 Transmitter Block Diagram of FIG. 4 shows PATCOs 401, 403 receiving 5 megahertz MultiPulse Triggers (MPT) 405, 415, Phase Code Set (PC Set) 407, 417 and Phase Code Reset (PC Reset) 409, 419 from Loran-C Timing Units (LTU) 411, 413. Also applied are the antenna current samples on line 421 and the Drive Half Cycle (DHC) samples on line 423, via the Attenuator Panel 490. Other status, timing, control and power functions are provided by status, timing and control circuitry 435.

The primary purpose of each PATCO 401, 403 is to generate four similar SERial DAta (SERDA) digital words for routing on signal lines 437 and 439, through the Signal Distribution Assemblies (SDA) 441, 443 to groups of Half Cycle Generator (HCG) units 450, 452, 454, 456, which have been defined by an operator in the coarse ECD switch setting. Each group of Half Cycle Generator units then generates one of the four half drive cycles 301, 303, 305, 307, required by the transmitter set. Each SERDA signal contains the fine timing and amplitude information required for the maintenance of the transmitted signal's leading edge for the particular ECD selected by an operator using the information obtained during chain calibration (coarse ECD), as known to those of ordinary skill in the art. In addition, the SERDA contain the timing requirements for the combined parallel outputs of the HCG groups assigned to the required four half cycles.

Figure 9:
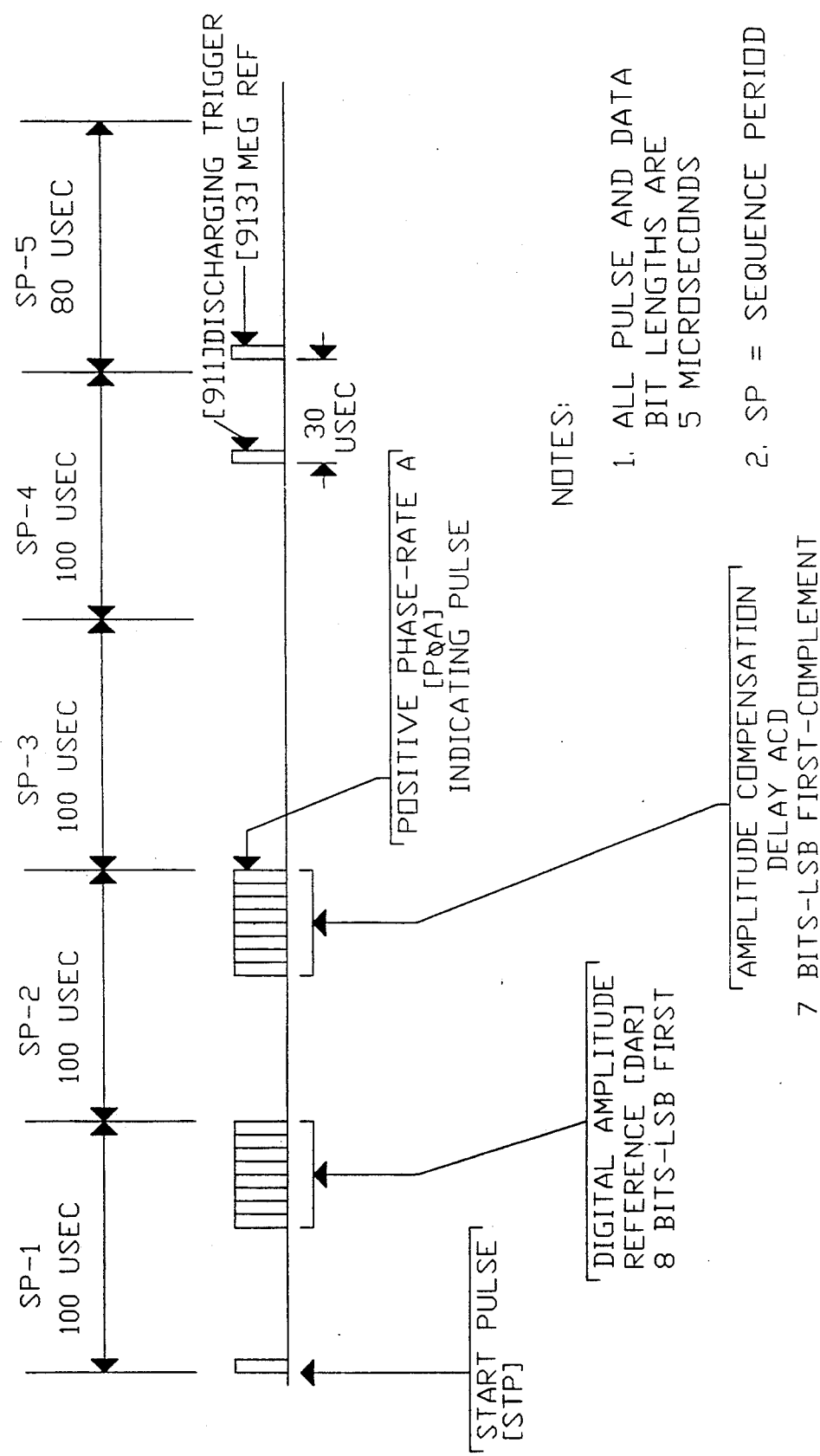
FIG. 9 shows a SERDA signal format.

The form of a SERDA signal is shown in FIG. 9, which illustrates five sequence periods from left to right in time, with 5 microsecond data bit lengths. SP-1 through SP-4 are each 100 microseconds long. SP-5 is 80 microseconds. SP-1 contains start pulse 909, charging trigger 909 and eight bits of digital amplitude reference (DAR), with the least significant bit transmitted first. SP-2 shows seven bits of amplitude compensation delay (ACD) information in a complemented format, with the least significant bit transmitted first. An eighth bit is the positive phase rate A indicating pulse. Discharging trigger 911 is shown in SP-4 followed 30 microseconds later by megatron reference 913 in SP-5. The use of the SERDA word in this format is discussed in more detail below.

Figure 5:
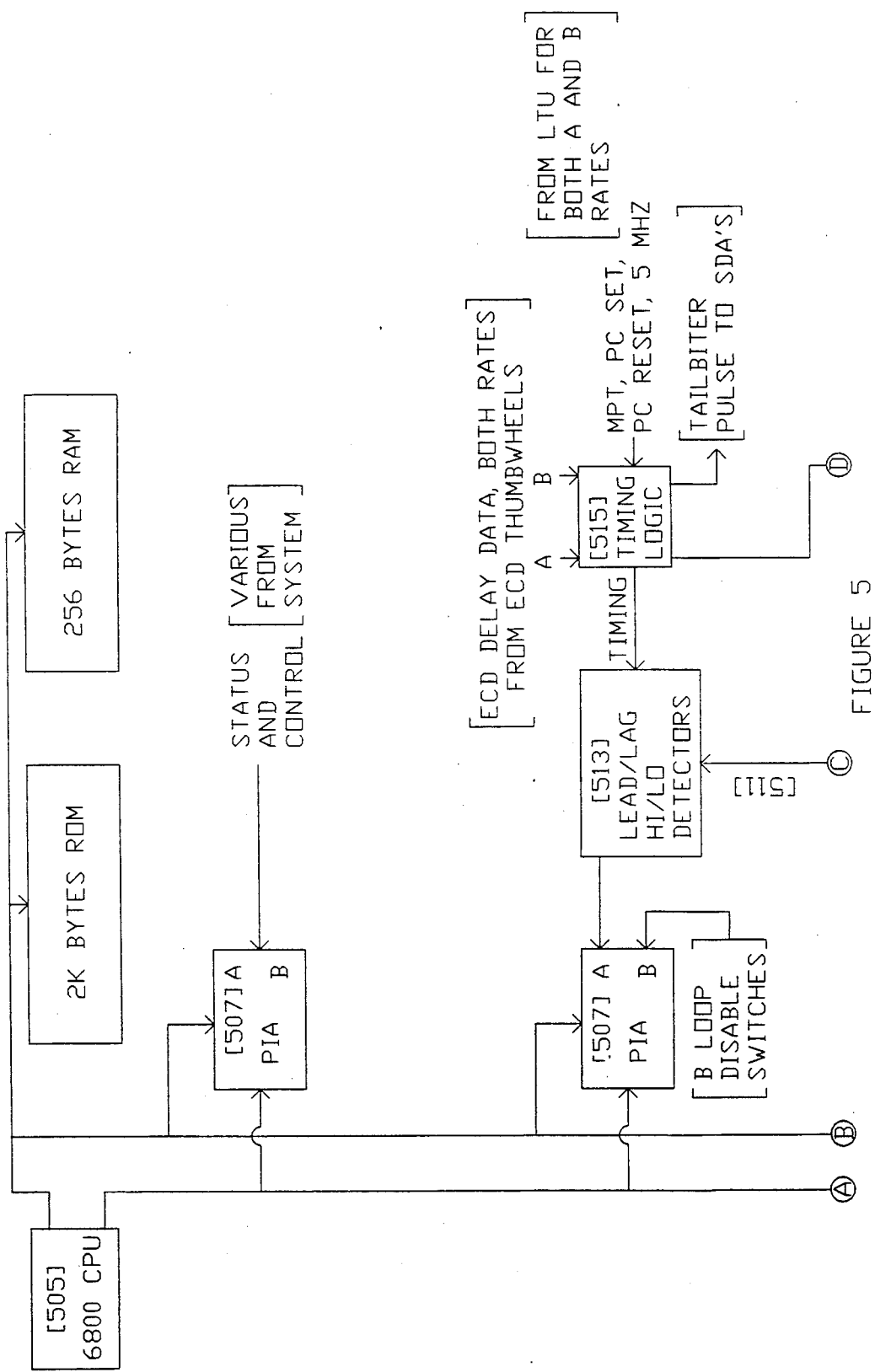
FIG. 5 and FIG. 5a is a PATCO simplified block diagram.
Figure 5A:
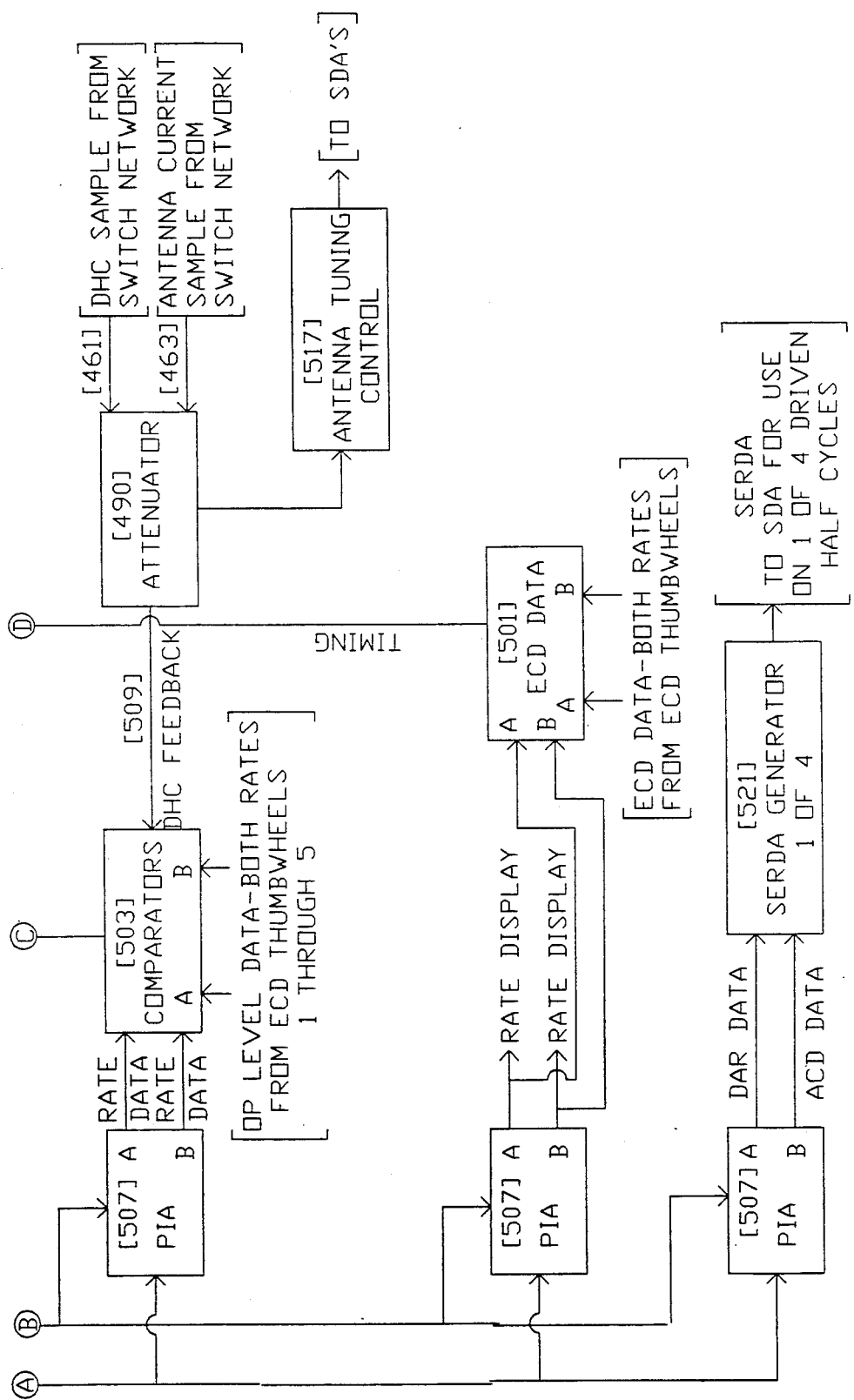
Figure 6:
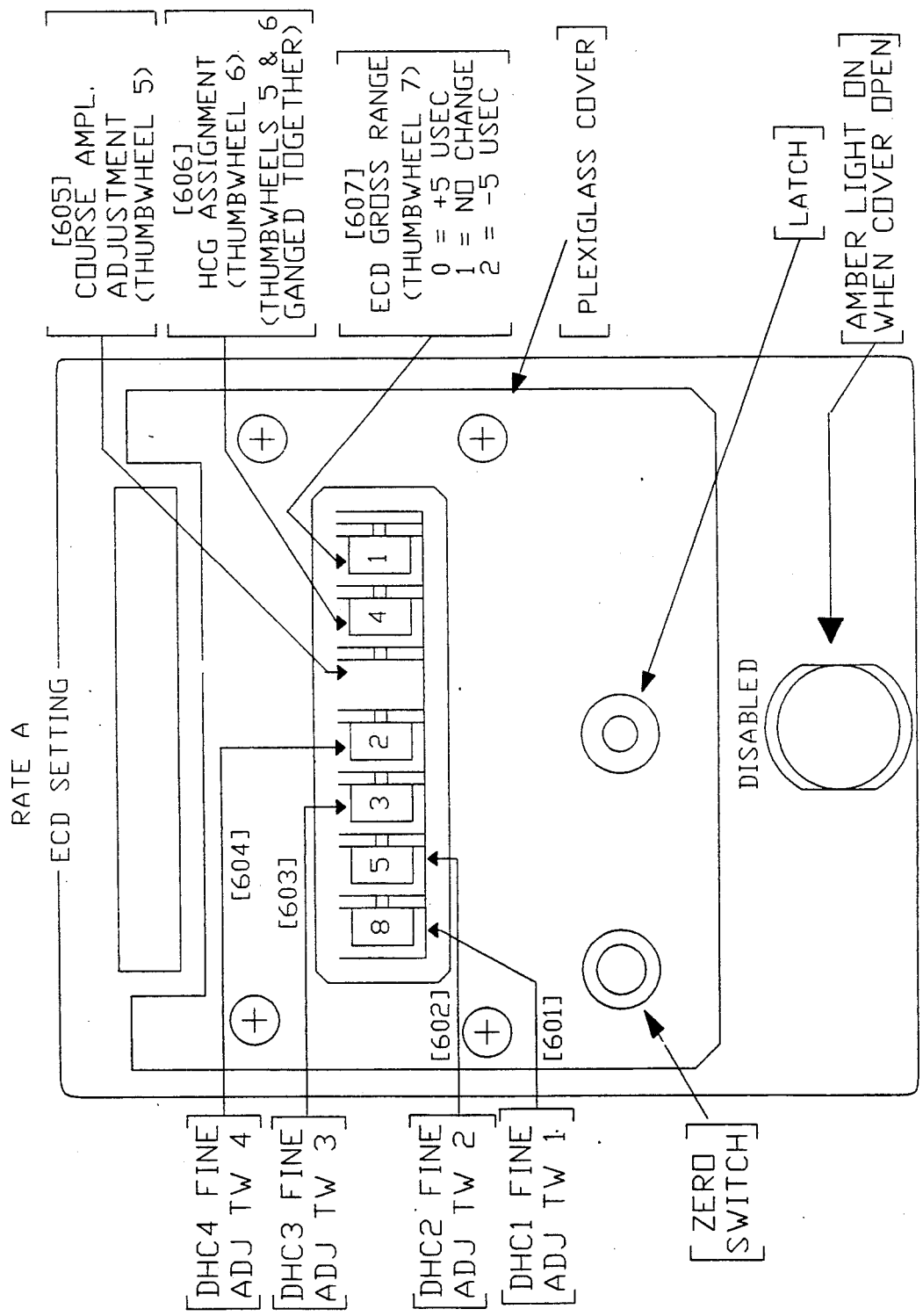
FIG. 6 shows an ECD thumbwheel switch.

The "PATCO Simplified Block Diagram" of FIG. 5 shows the relationship between the coarse ECD data, which is input by an operator, using the information obtained during chain calibration, via the "ECD Thumbwheel Switch" 601, shown in FIG. 6, and the fine timing and amplitude microprocessor controlled refinements which result in generating the SERDA signals.

Thumbwheels 601, 602, 603, 604 provide Drive Half Cycle information DH1-DH4, respectively, to comparison block 503 within a PATCO, e.g., 401. Coarse amplitude adjustment information from thumbwheel switch 605 is also provided to comparison block 503 and thumbwheel switch 606 is ganged together with switch 605 to provide HCG assignment. Comparison block 503 receives A and B rate operational data from microprocessor 505 through one of buffers 507. Comparison block 503 also receives the DHC feedback on signal line 509 from attenuator 490, which, as previously discussed, is responsive to DHC samples on signal line 461 and antenna current samples on signal line 463. This information is also used by antenna tuning control circuitry 517, which provides antenna tuning information to signal distribution assemblies 441, 443. The results of the DHC feedback comparisons are output on signal line 511 through detection circuitry 513 and a buffer 507 for use by microprocessor 505 in generating SERDA data. Timing logic block 515 provides timing signals in response to signals from Loran Timing Units 411, 413 and gross delay range information from thumbwheel switch 607. Microprocessor 505 provides data to SERDA generator 521, which provides the SERDA signals to signal distribution assemblies 441, 443 for use in one of the four driven half cycles. Note should be made that, although the basis for all computations by the microprocessor is the operator setting, via the thumbwheel switches, once a fixed ECD is established, the resulting SERDA signal is completely dependent on Drive Half Cycle (DHC) information collected at the output of the parallel groups of Half Cycle Generator units, as shown by signal lines 461 and 463 in FIG. 4. This forms a closed loop, as discussed above.

If the Loran-C Timing Unit (LTU) inputs are considered stable and because the ECD thumbwheel data is constant, further signal adjustment depends primarily on the condition of the "closed loop" variables. A result of current Loran-C designs is that a vast majority of all faults occur at or near the portion of the transmitter operating at the highest levels of radio frequency energy. It is the condition of this "loop" that the invention herein addresses. It should also be noted that the adjustment range of the loop is limited by the manufacturer to prevent both equipment damage and operation outside of tolerance. This "loop range" allows maximum range of automatic adjustment for both "requires increase" and "requires decrease" adjustment modes, at default value.

Figure 7:
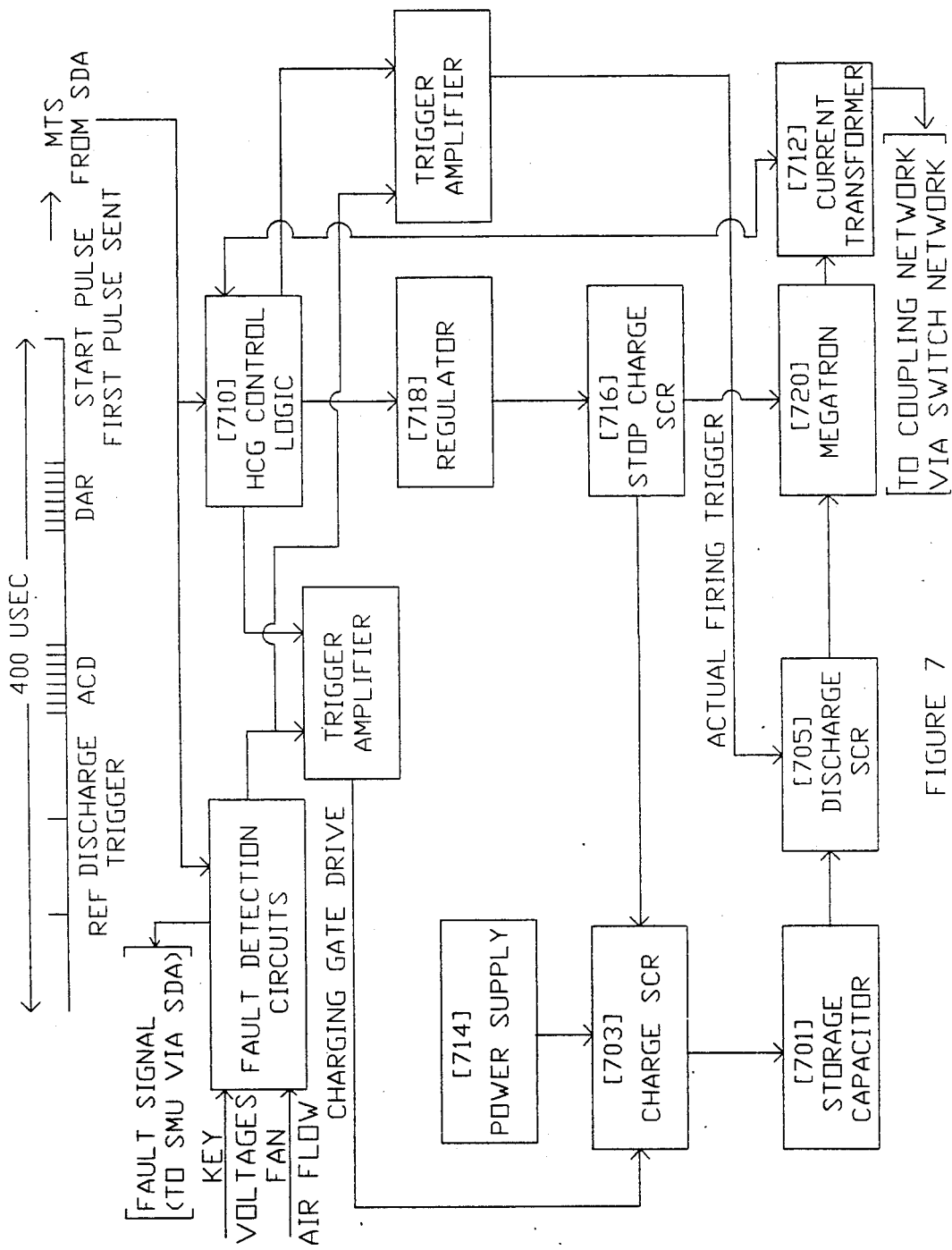
FIG. 7 is an HCG block diagram.
Figure 8:
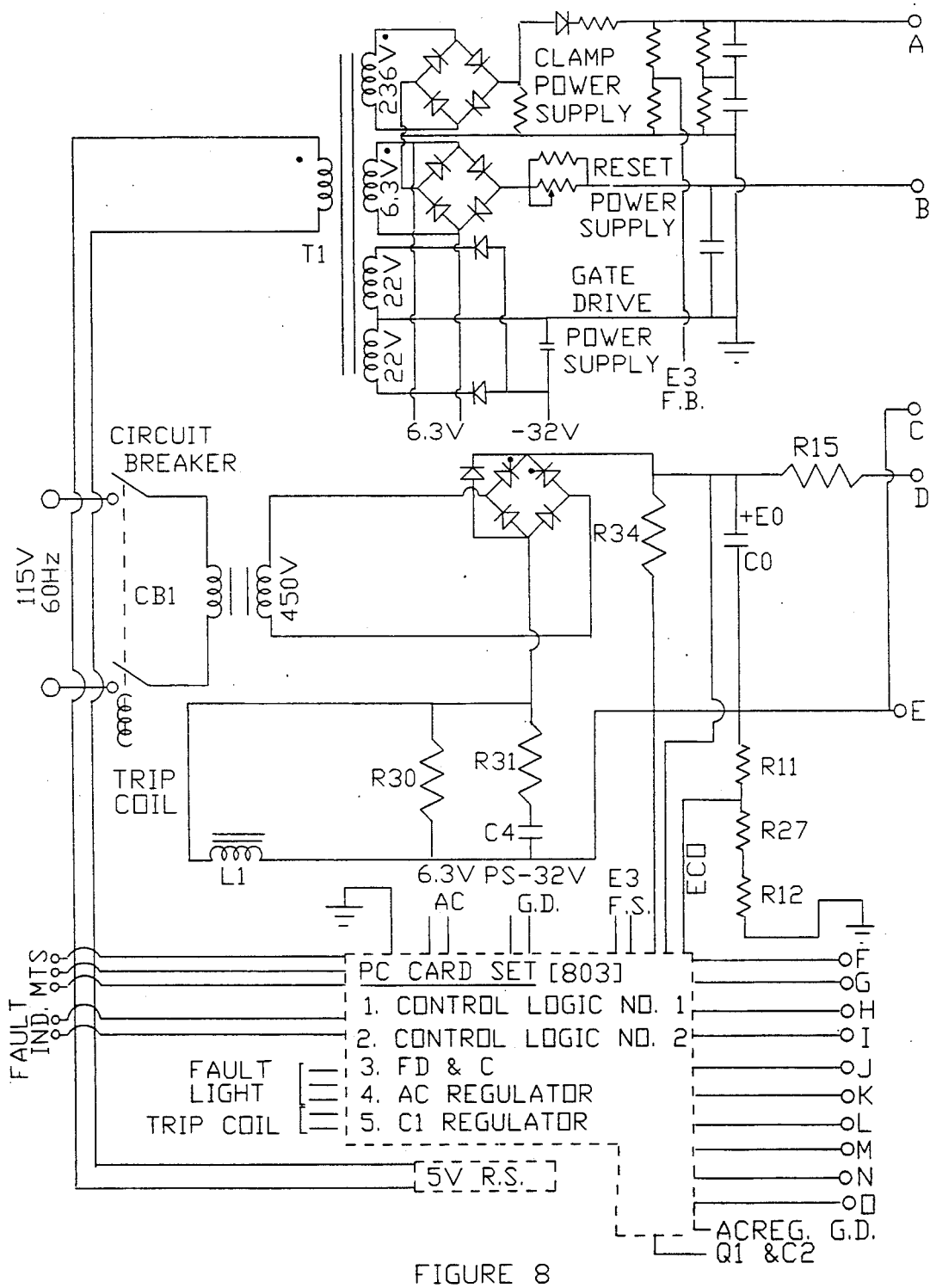
FIG. 8 through FIG. 8b is a simplified schematic of an HCG.
Figure 8A:
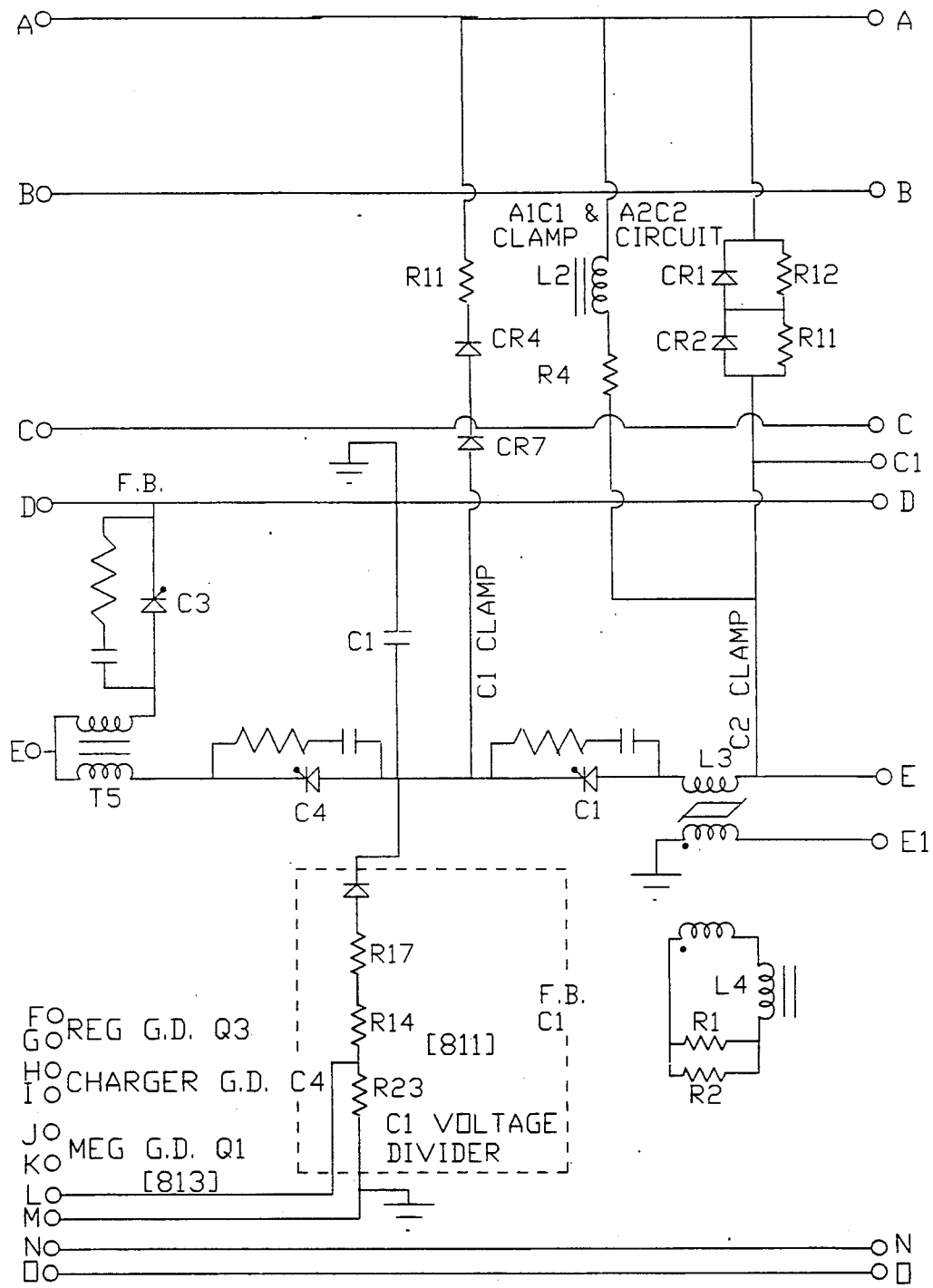
Figure 8B:
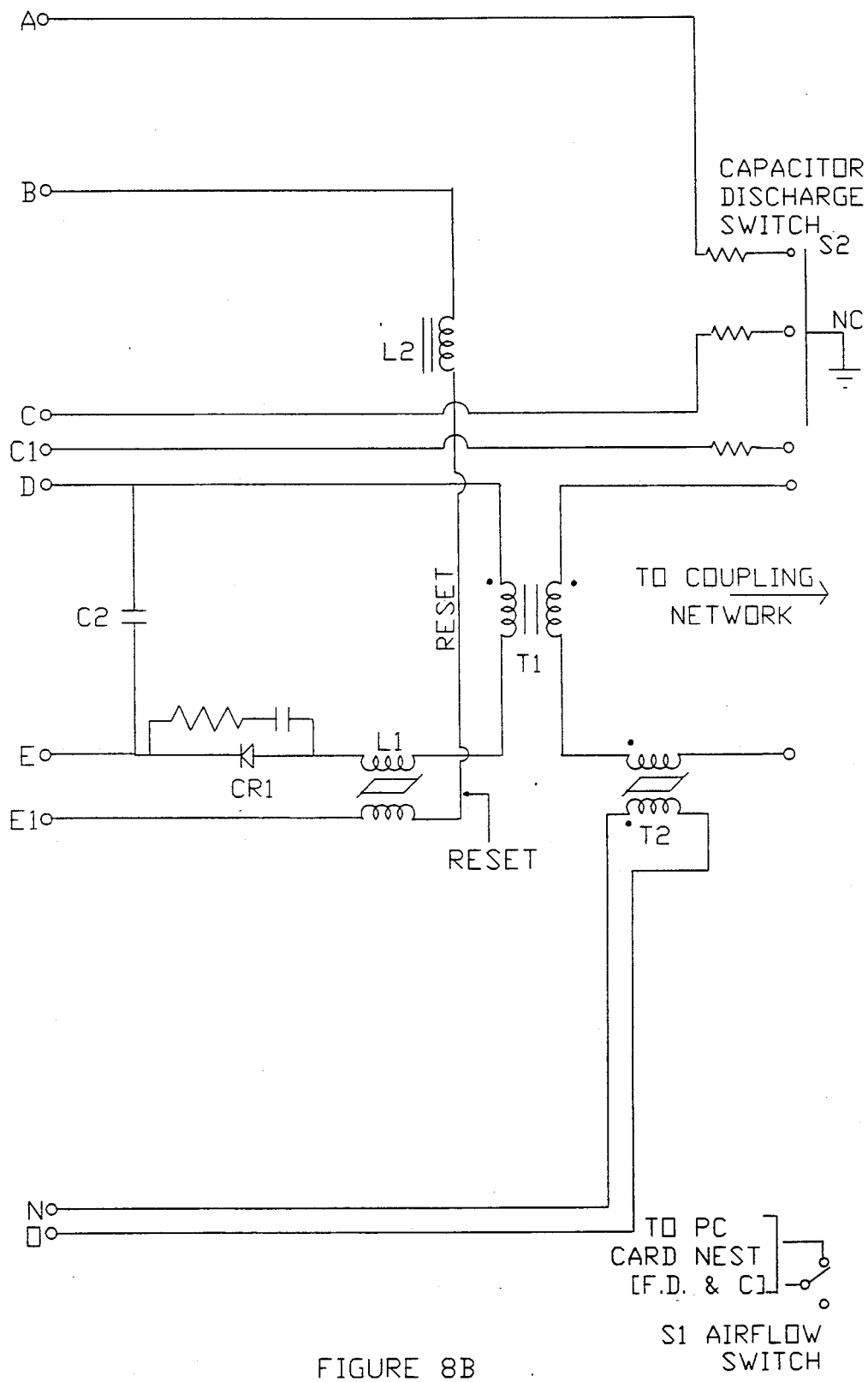

The HCG Block diagram of FIG. 7 and the schematic of FIG. 8 show that each individual Half Cycle Generator (HCG) unit is a primarily a finely tuned switch. A storage capacitor 701 is allowed to charge via the charge SCR 703 to a level determined by the digital serial amplitude data (SERDA). The capacitor 701 is then discharged into filter circuitry of the antenna via the discharge SCR 705 at a precise time, also determined by the SERDA. However, the content of SERDA depends upon the Drive Half Cycle feedback signal 509 developed from the parallel combination of all Half Cycle Generator units operating on that particular half cycle, as shown in FIG. 4. If all of the Half Cycle Generator units operating on a particular half cycle do not operate very close to identically, SERDA adjusts all Half Cycle Generator units for that particular half cycle until reaching a point where the operator supplied ECD information is satisfied. This point is not necessarily a midpoint of the loop's adjustment range. Since a different SERDA signal is generated for each half cycle, the loop operating point values can vary independently.

Using a Multipulse Trigger Sequence (MTS) provide by the SERDA data through signal distribution assemblies 441, 443, HCG control logic 710 triggers the charge and discharge SCRs 703 and 705, respectively. Charge SCR 703 is also connected to power supply 74 and to a stop charge SCR 716 controlled by HCG control logic 710 through regulator 718. HCG control logic 710 is also responsive to an output of current transformer 712, which provides drive signals to the coupling network via the switch network 431, thus completing the feedback loop. FIG. 8 further illustrates the locations of components in the half cycle generator. The HCG logic can be incorporated in the HCG chassis as part of printed circuit (PC) card nest 803. Megatron 720 includes megatron charger module and megatron module of FIG. 8, whose output is provided to the coupling network. These are known circuit configurations and are not further detailed here.

Figure 11:
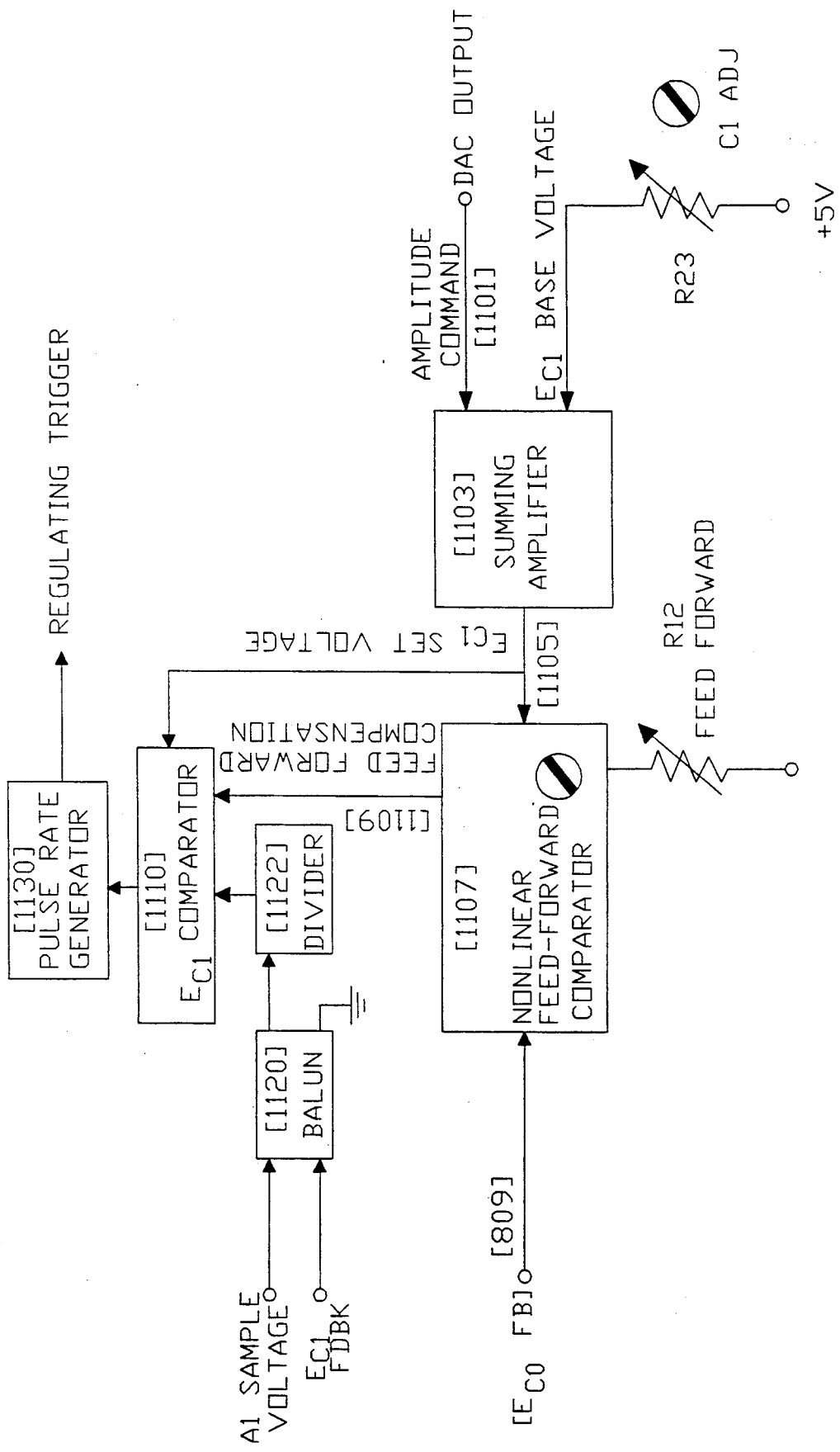
FIG. 11 shows a block diagram of a C1 regulation board.

The SERDA words are used to regulate timing associated with the ECD by controlling voltage to activate the charge and discharge SCRs 703 and 705. FIG. 11 is a simplified diagram of the circuitry for regulating $E_{c1}$. This circuitry can be incorporated into the PC card nest 803, shown in FIG. 8. The DAR word is supplied to a digital to analog converter (not shown). The corresponding DAC output is applied as an amplitude command on signal line 1101, shown in FIG. 11b as pins 27 and 28, to summing amplifier 1103, shown in FIG. 11b as U3 in feedforward circuitry 1107. An adjustable $E_{c1}$ base voltage is also provided through resistor R23. The output of summing amplifier 1103 determines the $E_{c1}$ set voltage to be $-800$ V$+/-5$ V. The summing amplifier output 1105 is provided to the nonlinear feedforward comparator 1107, shown as U2 in FIG. 11b, which is connected to adjustable resistor R12 and an $E_{co}$ feedback signal 809. Feedforward compensation 1109 provided by nonlinear comparator 1107, shown in FIG. 11b as U2, is transmitted to $E_{c1}$ which is part of C1 comparator circuitry 1110.

Figure 11A:
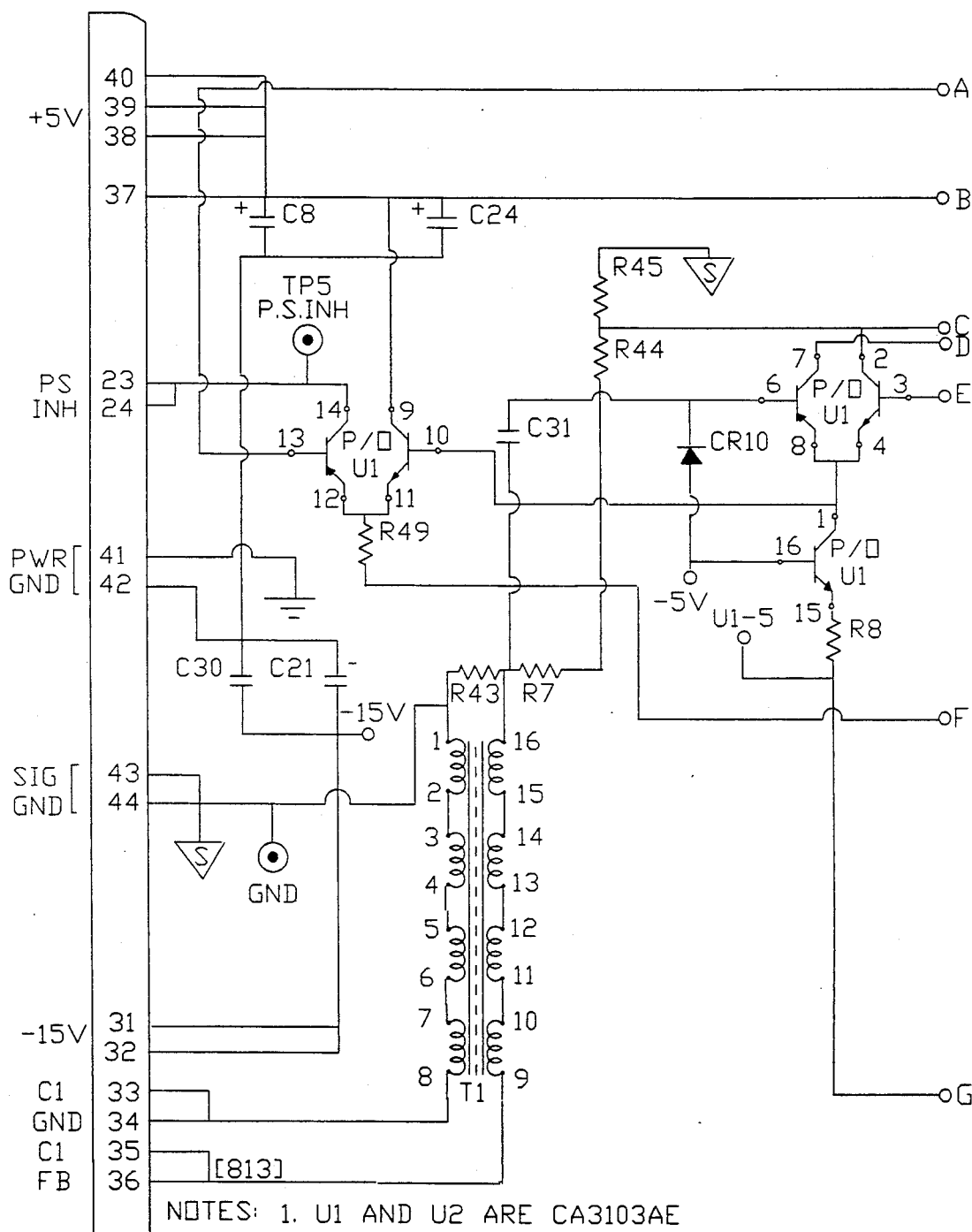
FIG. 11a and FIG. 11b is a more detailed illustration of a C1 regulation board.

A sampled signal is combined with $E_{c1}$ feedback from voltage divider 811 in Balun 1120 and divider 1122 for comparison in comparator 1110. The output of comparator 1110 activates pulse rate generator circuitry in FIG. 11a, to generate regulating triggers to the SCRs on pins 19 and 22.

In a large transmitter, e.g. 64 Half Cycle Generators, the operating point of up to 25 individual Half Cycle Generator units can be effected by misalignment of a single unit and/or a faulty HCG. Currently used manufacturers' alignment techniques based on alignment of individual Half Cycle Generators fail to consider closed loop effects. When dealing with such a closed loop system, any adjustment within the loop effects all components of the loop. Thus, a fixed reference point must be found within the loop where all adjustments can be made, and measured against a standard. The standard is the default value of the closed loop. For example, in the ACCUFIX 6500 transmitter, the default value of the closed loop is the value at which the microprocessor starts its automatic SERDA signal adjustment, which ultimately results in satisfying the ECD requirement issued by the operator. Manufacturers, such as Megapulse, have set this default value very close to the midpoint of the most critical individual half cycle range. At this point, and only at this point is it assured that all four Drive Half Cycle loop values are nearly identical and that the SERDA signal is commanding substantially the same amplitude output requirements from all Half Cycle Generator (HCG's) units. By inhibiting any loop level adjustment, and not allowing the feedback signal into the processor's calculations the transmitter can be evaluated and the Half Cycle Generator units aligned when the transmitter is fully operational. This avoids less than optimal performance resulting from test bench alignment of transmitter modules.

Figure 10:
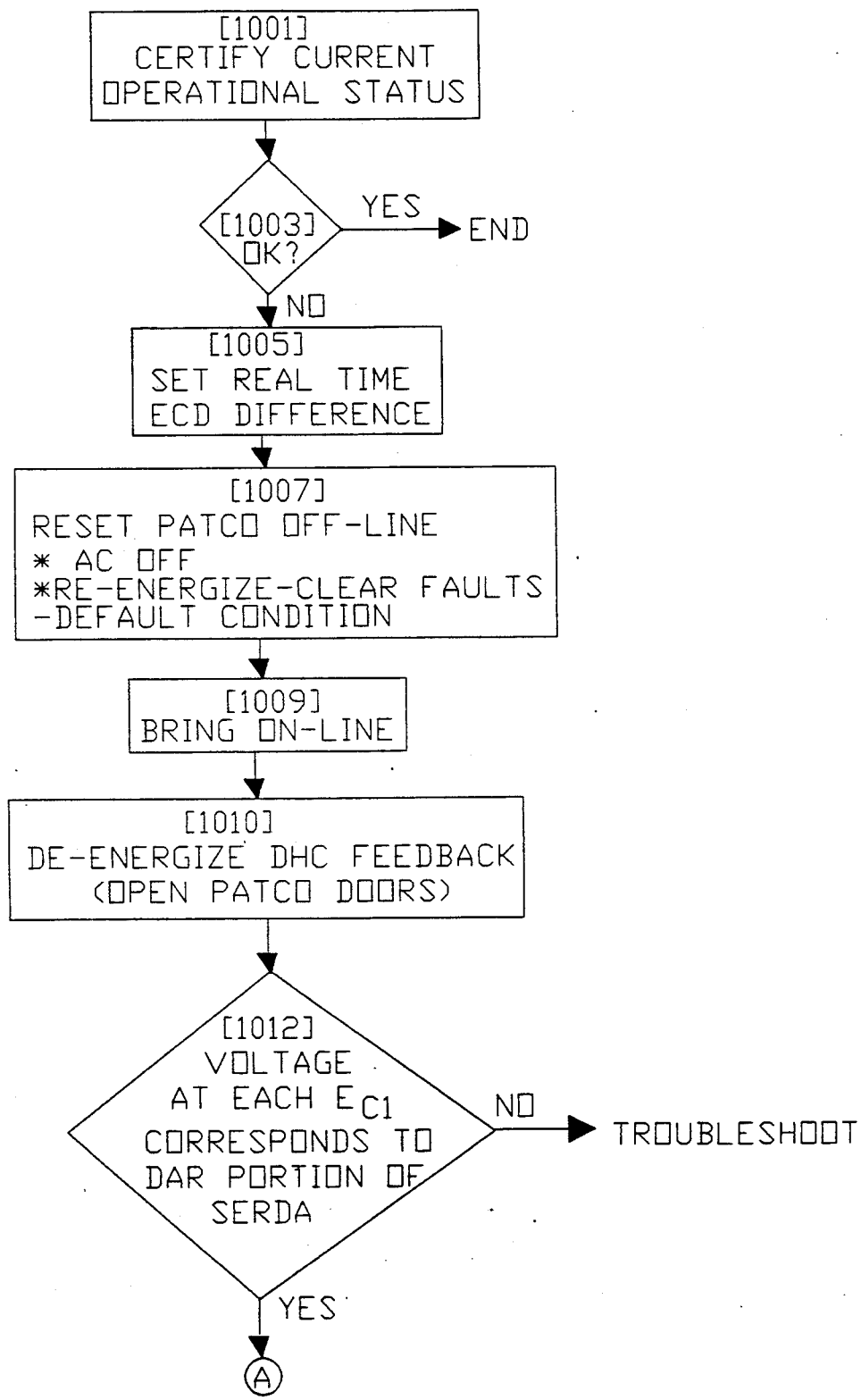
FIG. 10 through FIG. 10c is a flow diagram of the method according to the invention.
Figure 10A:
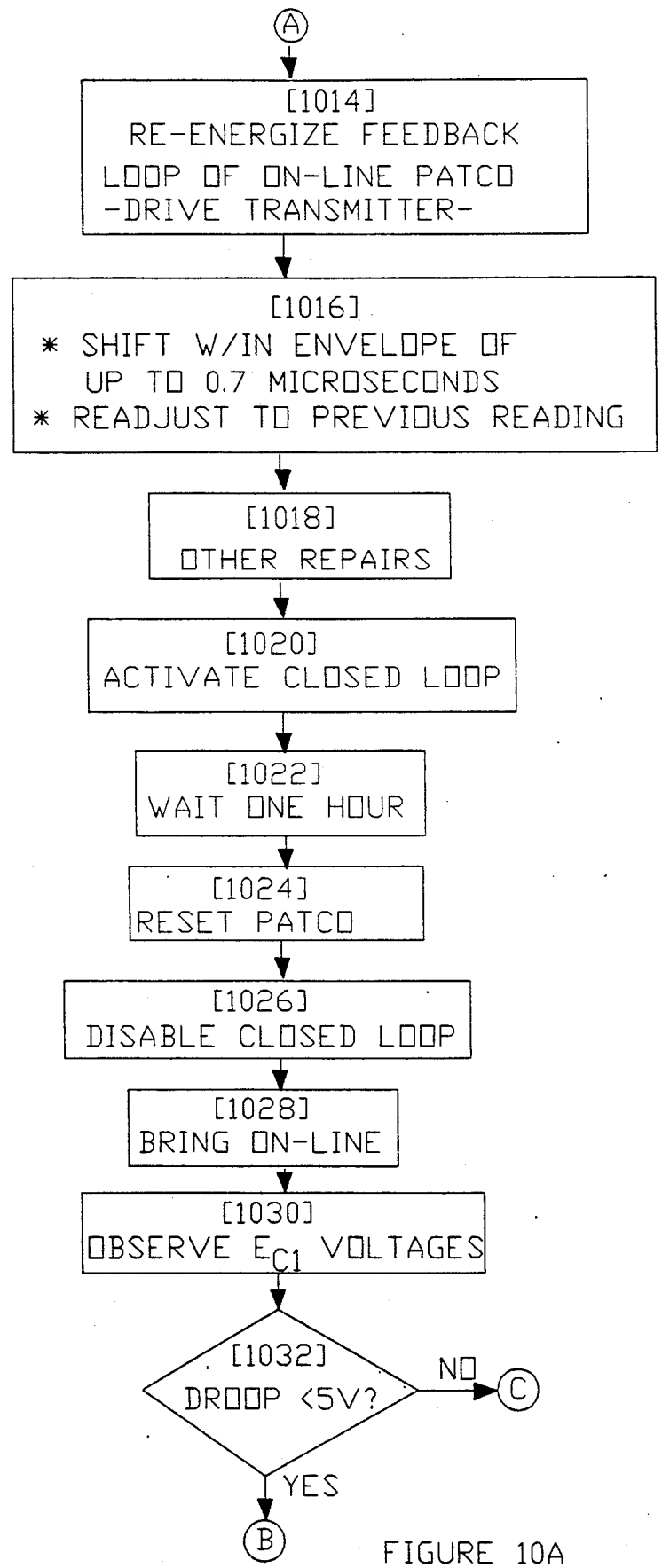
Figure 10B:
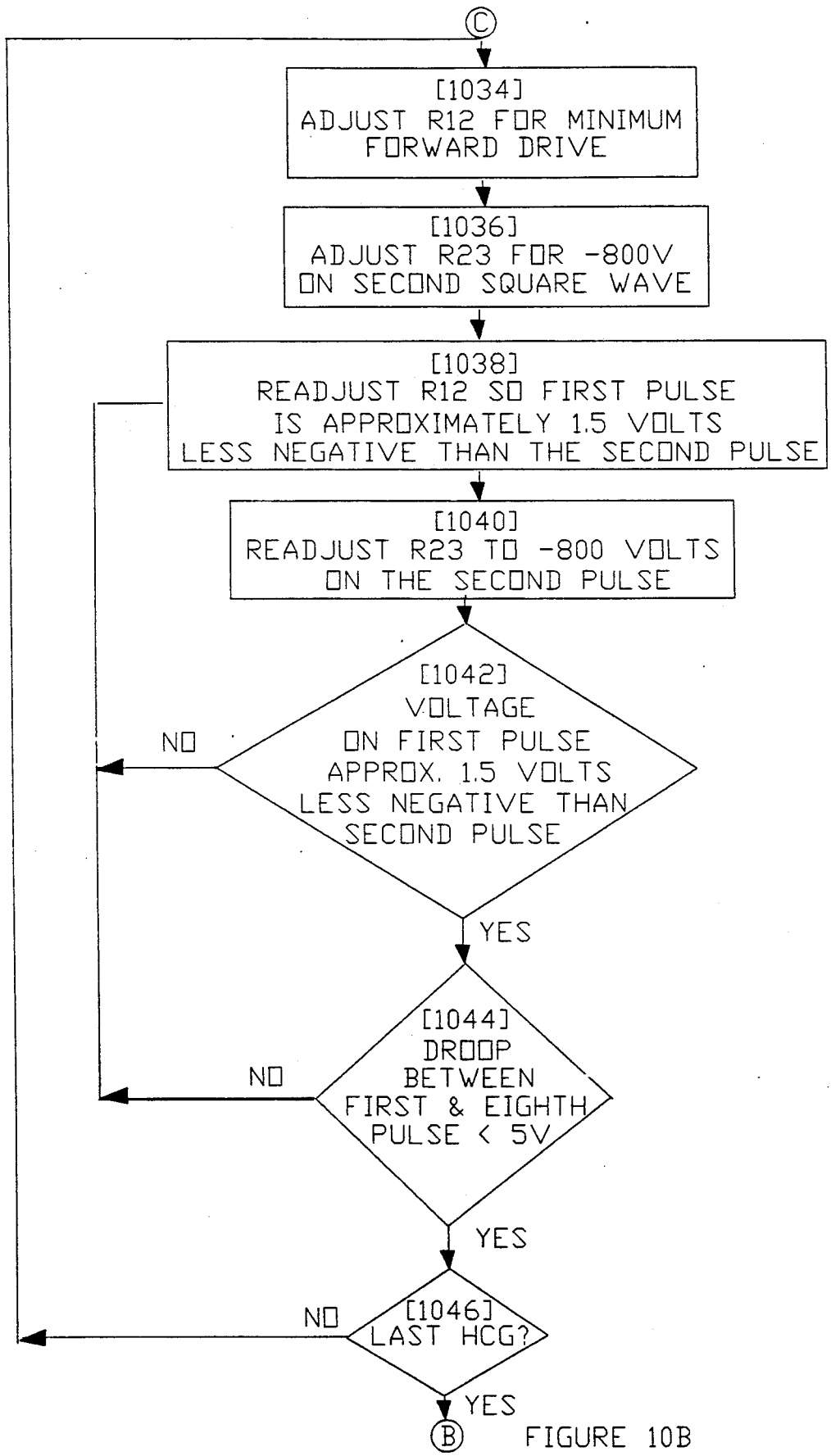
Figure 10C:
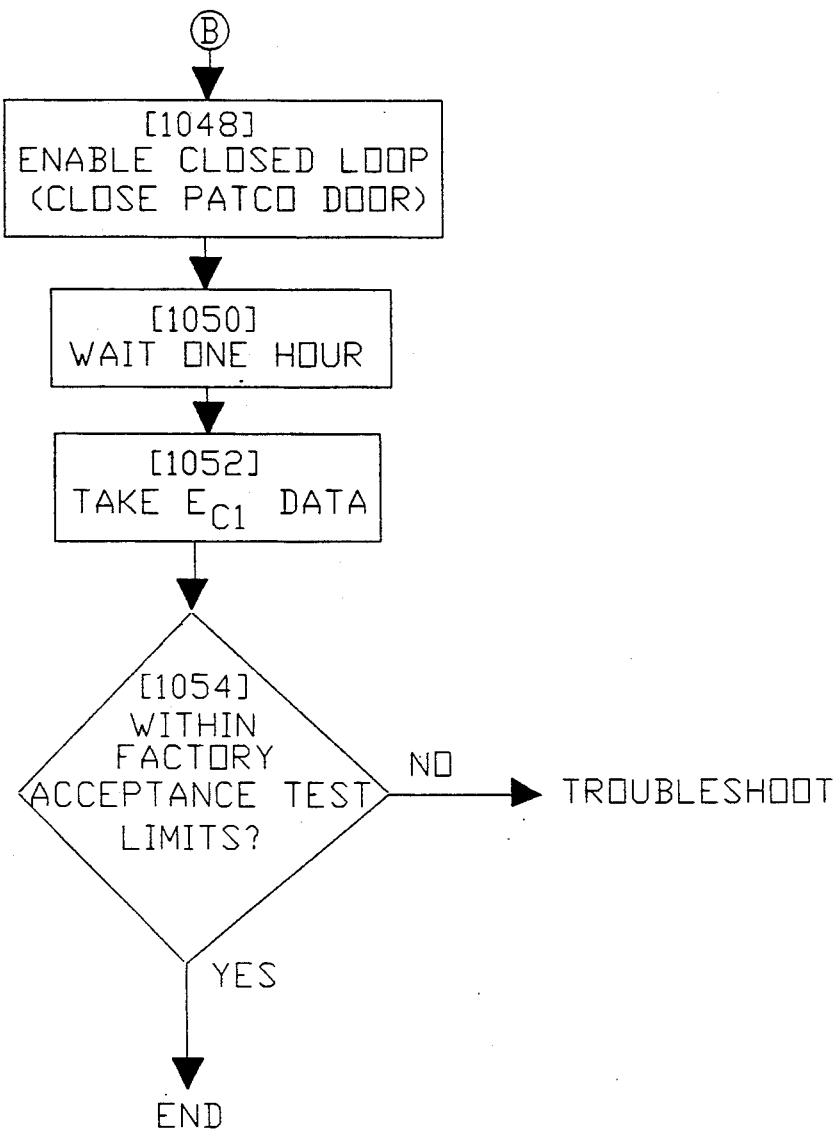

FIG. 10 illustrates the method according to the invention. Loran-C systems are usually aligned using test sets which first obtain a complete set of certification readings, as shown in step 1001. This set of readings then becomes the standard from which all conclusions are made as to system operation. If a unit meets performance specifications, no further alignment is required (step 1003). To begin testing and alignment, a control station is directed to record and relay all Envelope-to-Cycle Differences (ECD) or Control Number (CN) numbers, so that a real time ECD reference is set (step 1005). An off-line PATCO is reset by removing both the AC line voltage and then the DC backup voltage (step 1007). It is then re-energized and allowed to clear out any faults. When a PATCO is not operational, the loops are inhibited. Under this inhibit condition, there is no danger of loop values changing while faults are sorted out.

Next, the PATCO is brought on-line (step 1009). The DHC feedback is then de-energized (step 1010) by opening the ECD thumbwheel doors. Opening the PATCO ECD thumbwheel switch doors shown in the "ECD Thumbwheel Switch" diagram, FIG. 6, removes the drive half cycle (DHC) feedback from the microprocessor calculations. The four SERDA words, being generated by this PATCO according to the "SERDA Signal Format" in FIG. 9, are now identical for the eight bit Digital Amplitude Reference (DAR) portion of the SERDA signal. This is the portion of the SERDA that "tells" the first high level storage capacitor to charge to a defined level. As shown in FIG. 7, this capacitor (701) is located within the Half Cycle Generator. The DAR portions of the SERDA are equal because in the default condition, they drive each half cycle generator to the same output, as discussed below.

The Digital Amplitude Reference (DAR) word read should correspond exactly to the peak negative signal voltage measured as $E_{c1}$ at the Megatron Charger of each Half Cycle Generator. Since the system being brought on line is at "default," all C1 minus voltages of all HCGs should be identical. If the DARs are not the same or a C1 minus voltage does not correspond (step 1012), a failure may be indicated.

The "reset" PATCO is placed on line and allowed to drive a transmitter (step 1014). Since all four SERDA signals now contain the same Digital Amplitude Reference word, $E_{c1}$ voltage signals in all HCG's should be exactly the same when the reset PATCO is placed in the operate mode to drive the transmitter. Depending on the number of Half Cycle Generators in a particular transmitter, a shift in radiated ECD of up to 0.7 microseconds occurs. The radiated signal timing may change slightly but can be adjusted back (step 1016) to the previous readings by inserting a "maintenance phase adjustment" to the Loran-C Timing Unit. This is accomplished by adjusting the duration of the Group Repetition Interval to cause the station to slew in time to the center of tolerance. The transmitter is now on-line operating closed loop at the default values and the radiated signal is in tolerance.

This operational condition can be maintained for an indefinite period of time. The criteria for the total evaluation of all component parts of the closed loop is now a reality. Since the "input" to the loop, which is the Digital Amplitude Reference portion of the SERDA signal, is fixed and at "center loop" or default, the required evaluation standard is the reproduction of this DAR instruction at the first point of high level energy transfer. This means that the HCG logic generates an SCR gate pulse to charge capacitor C1 to $E_{c1}$ to assure transmit at specific times.

Before closing the loop, it may be convenient to test for other performance criteria. For example, Intra Pulse Group Droop and Group to Group Droop can be measured. Excessive Group to Group Droop often indicates the need for replacement of the megatron charger's swamp resistors or SCR Q4. AC power supply ripple can also be detected and corrected and HCG power supply voltages can be checked. This is shown as step 1018.

DHC feedback can then be applied by closing the PATCO ECD to activate the closed loop (step 1020). After allowing about an hour for the Loran-C system to settle out (step 1022), a second set of data can be taken as a reference for final alignment. This can be accomplished in step 1024 by resetting the off-line PATCO as discussed above and then disabling the loop by opening the PATCO ECD doors to allow fault clearing (step 1026) and bring this machine on line (step 1028). Once again, all Digital Amplitude Reference (DAR) signals are equal and all Half Cycle Generators are being commanded to produce the same output signal.

Each individual $E_{c1}$ voltage is then observed (step 1030) to be a predetermined voltage, e.g. $-800$ V$+/-5$ V, with the droop between the first and eighth pulses less than about 5 volts. If this is not the case, alignment is required because the modules, although operating properly individually, were aligned with a different number of Half Cycle Generators in parallel and are now working into a different impedance.

Figure 11B:
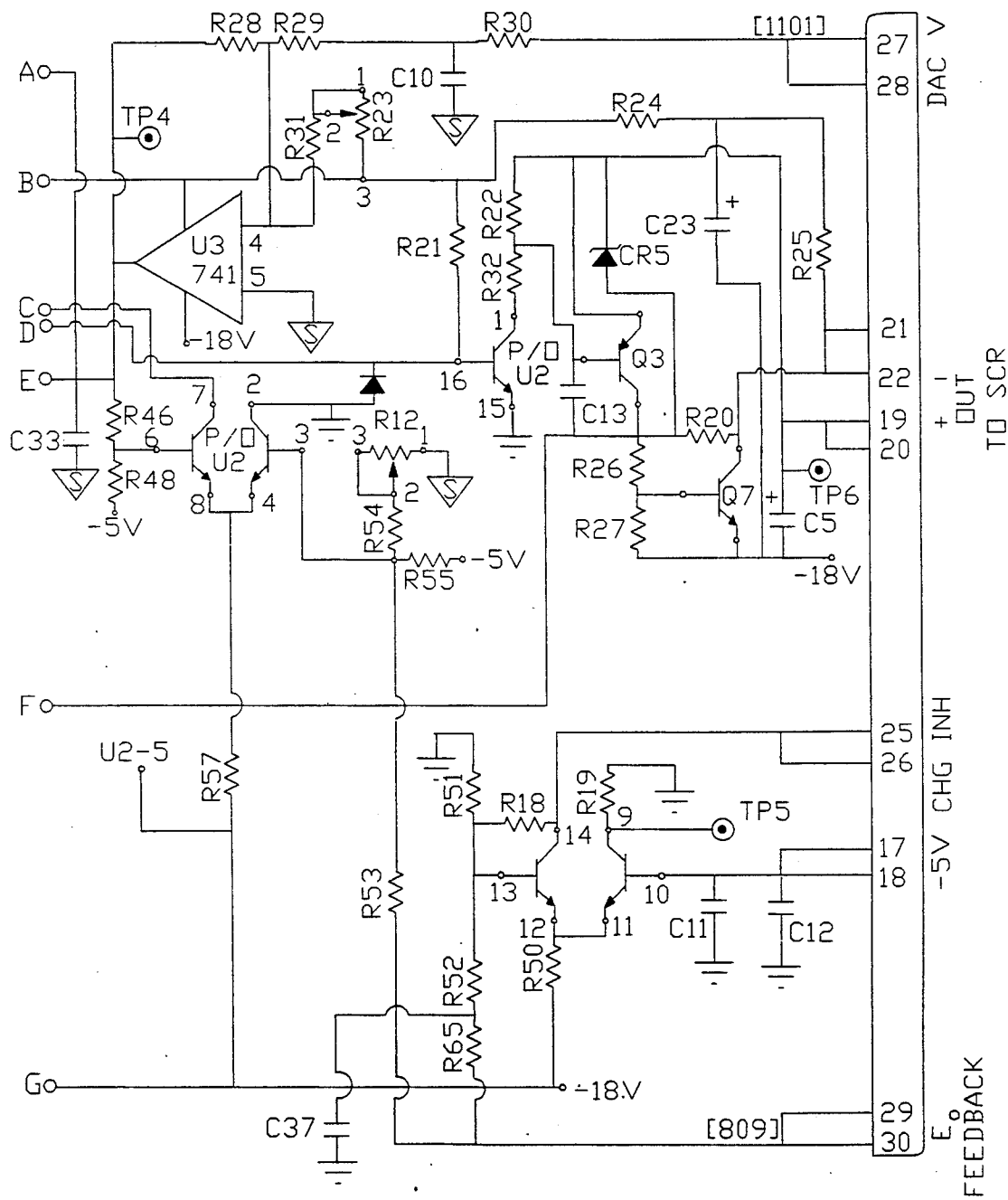

If alignment is required, a forward feed resistor, R12 on the C1 Comparator Feed Forward Board, shown in FIGS. 11 and 11b, is adjusted to an extreme minimum forward drive position by turning the adjustment fully counter clockwise (step 1034). A second resistor R23, is adjusted to obtain the predetermined voltage of $-800$ V$\pm 5$ V on the second square wave (step 1036). The first resistor, R12, is then adjusted so that the first pulse is about 1.5 volts less negative than the second pulse (step 1038). At step 1040 R23 is readjusted again to obtain $-800$ V (Ec1 Voltage) and R12 is again readjusted to obtain the 1.5 V difference between the first and second pulse of Ec1. The process is repeated until a signal of $-800$ V is obtained on pulse 2 and the first to second pulse difference is 1.5 volts with a droop of less than 5 volts between pulses #1 and #8 (steps 1042, 1044).

The above process is repeated for each Half Cycle Generator, whether or not the HCG appears to require it (step 1046). This sets the feed forward of each of the four groups of parallel HCGs to be the same. As a result, the reaction of the loops to automatic adjustment will be identical.

The PATCO ECD doors are then closed (step 1048) and about one hour allowed for loop settling (step 1050). There is likely to be a dramatic increase in output power and a definitive change in locally monitored ECD. A third set of data is then taken (step 1052) and the measured ECD compared with the ECD measured at the factory acceptance test (step 1054). By opening the PATCO ECD doors (FIG. 6) and not resetting the PATCO (FIG. 6), the loop values are locked at their normal operating values.

Figure 12:
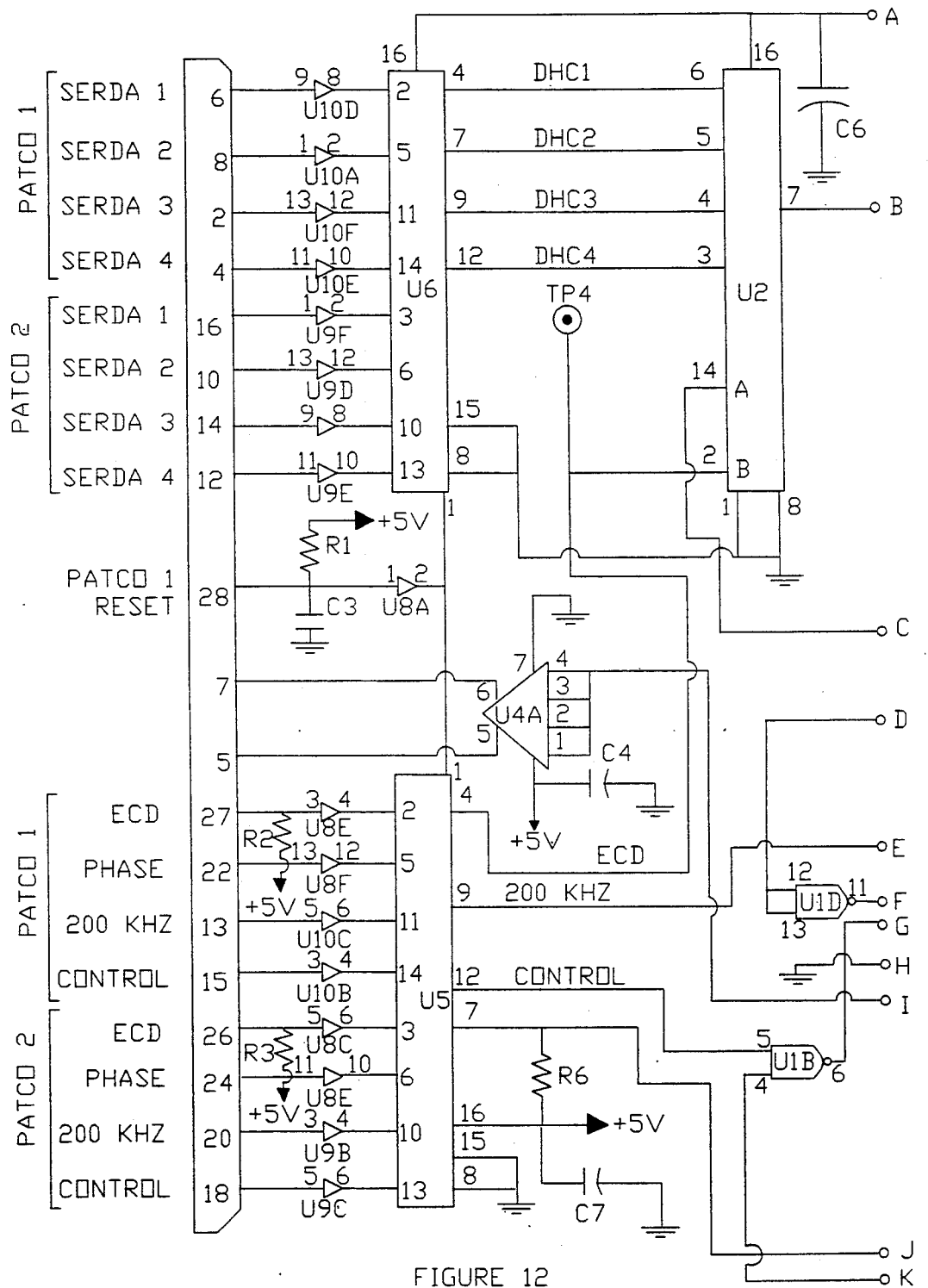
Figure 12A:
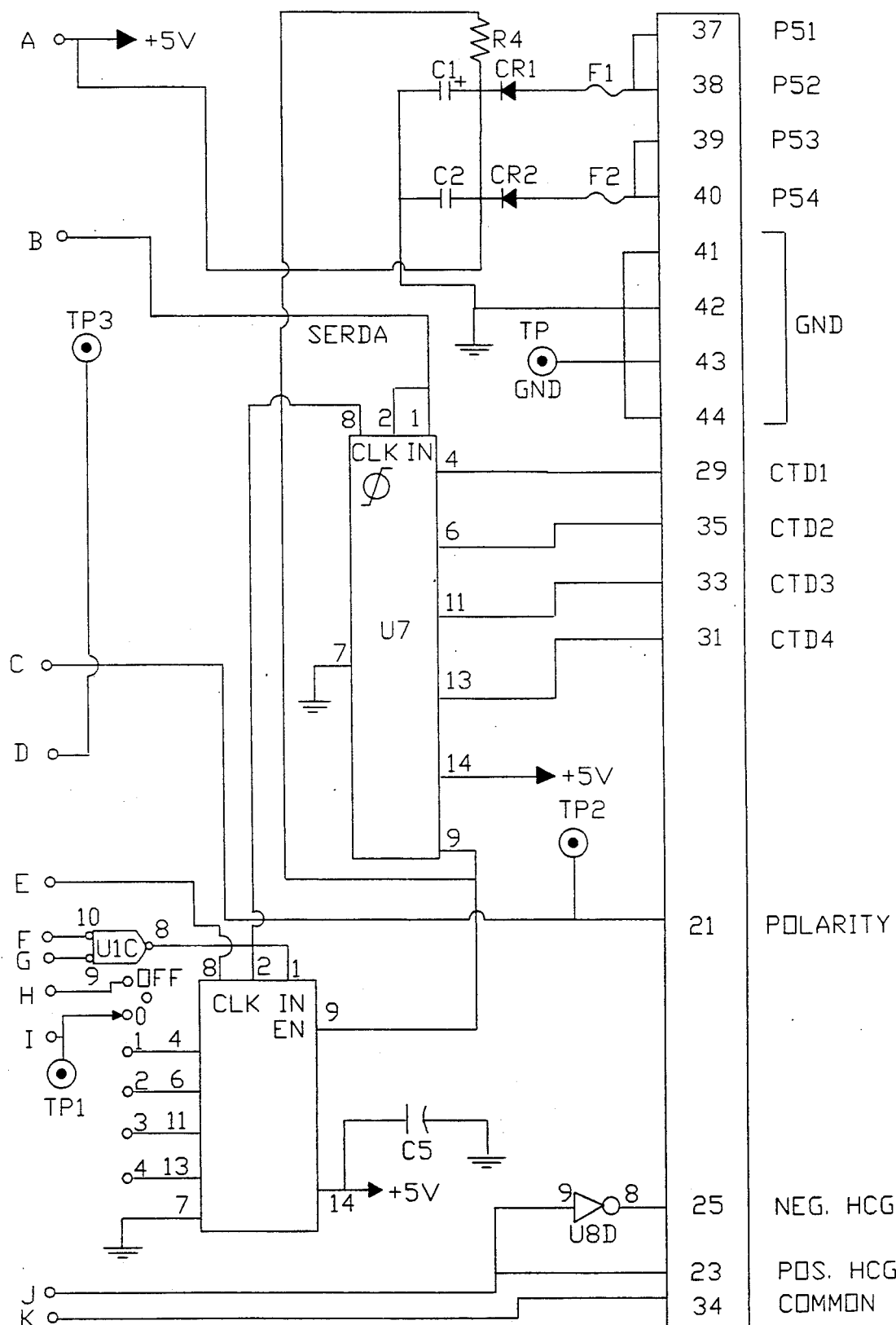

Each of the Digital Amplitude Reference (DAR) words at a particular test point, TP1 shown in FIG. 12a, of the appropriate "Signal Distribution Printed Circuit Board (PCB)" is read to determine the Multiple Trigger Sequence (MTS) or the signal going directly to the low level logic in the Half Cycle Generators, as previously discussed.

An exact value for each of the four DAR "words" is determined and the $E_{c1}$ voltages at each HCG are measured to insure that they match the measured DAR value. This proves that the loop values for each half cycle are changing or "spreading" in a linear predictable fashion and that no unfound problems exist in the HCGs at the higher operating levels.

While specific embodiments of the invention have been described and illustrated, it will be clear that variations in the details of the embodiments specifically illustrated and described may be made without departing from the true spirit and scope of the invention as defined in the appended claims.

What is claimed is:

1. An on-line method of aligning a Loran-C transmitter without comparison to a known operating unit, the Loran-C transmitter having a plurality of Half Cycle Generators operating in a closed loop with a Pulse Amplitude and Timing Controller, the method comprising the steps of:

breaking the closed loop between the Pulse Amplitude and Timing Controller and the Half Cycle Generators, thereby removing loop level adjustments from effecting alignment;

transmitting to the Pulse Amplitude and Timing Controller a first signal representing a coarse Envelope to Cycle (ECD) difference set by an operator;

resetting the Pulse Amplitude and Timing Controller to produce a same voltage on a megatron charger for each Half Cycle Generator;

activating the closed loop and operating the transmitter for a predetermined time period;

resetting the Pulse Amplitude and Timing Controller;

breaking the feedback loop a second time; and measuring an amplitude of the voltage at the megatron charger of each Half Cycle Generator and adjusting each voltage amplitude to be a same predetermined value.

2. The method recited in claim 1 wherein the step of measuring the amplitude of the voltage at the megatron charger comprises:
   measuring signal amplitudes of a plurality of pulses at each megatron charger;
   determining if the amplitudes measured are within a predetermined range of the predetermined value;
   if the amplitudes are not within the predetermined range, adjusting a feed forward signal of each of a plurality of groups of Half Cycle Generators to a same value, thereby causing the feedback loops for the half cycle generators to react in a substantially identical manner.

3. The method recited in claim 2 wherein the step of adjusting the feed forward signal of each group of Half Cycle Generators comprises:
   adjusting a first forward feed resistor to an extreme minimum forward drive position;
   adjusting a second resistor to obtain the predetermined megatron charger voltage value at the second pulse; adjusting the feed forward resistor to obtain a first pulse with a predetermined amplitude less than the first pulse.

4. The method recited in claim 1 wherein the alignment is performed on the loop at the highest level of radio frequency energy.

5. The method recited in claim 1 wherein drive half cycle feedback signals are generated for a parallel combination of the plurality of Half Cycle Generators while the closed loop is activated, and wherein corresponding data words are generated to adjust all Half Cycle Generators for a particular half cycle, the data words changing in both amplitude and timing until the operator specified envelope to cycle difference is satisfied.

6. The method recited in claim 5 wherein a processing means generates the data words, the processing means beginning with a data word representing a defaults value of the closed loop, the default value being near a midpoint of a most critical individual half cycle range the most critical individual half cycle range being pulse half cycle amplitude and timing values that allow a widest range of automatic adjustment, the default value being a point at which the plurality of loops is commanded to a same point.

7. The method recited in claim 5 wherein the data word is a serial data word.

8. The method recited in claim 5 wherein the data word is comprised of a digital amplitude reference portion, the digital amplitude reference portion identifying the magnetron charging voltage to be set within a Half Cycle Generator.

9. The method recited in claim 8 wherein the digital amplitude reference is an input to the closed loop and is set at the default value.

10. The method recited in claim 9, wherein the digital amplitude reference is reproduced at a first point of high level energy transfer in each half cycle generator.

* * * * *